(12) United States Patent
Chen et al.

(10) Patent No.: US 11,099,363 B2
(45) Date of Patent: Aug. 24, 2021

(54) LENS DEVICE

(71) Applicants: Sintai Optical (Shenzhen) Co., Ltd., ShenZhen (CN); Asia Optical Co., Inc., Taichung (TW)

(72) Inventors: Bo-Yan Chen, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 183 days.

(21) Appl. No.: 16/665,017

(22) Filed: Oct. 28, 2019

(65) Prior Publication Data

US 2020/0241263 A1 Jul. 30, 2020

(30) Foreign Application Priority Data

Jan. 29, 2019 (CN) .......................... 201910085174.5

(51) Int. Cl.

| G02B 13/00 | (2006.01) |
|---|---|
| G02B 13/18 | (2006.01) |
| G02B 9/64 | (2006.01) |
| G02B 5/00 | (2006.01) |
| G02B 13/06 | (2006.01) |

(Continued)

(52) U.S. Cl.
CPC .............. *G02B 13/18* (2013.01); *G02B 9/64* (2013.01); *G02B 5/005* (2013.01); *G02B 13/002* (2013.01); *G02B 13/006* (2013.01); *G02B 13/0045* (2013.01); *G02B 13/04* (2013.01); *G02B 13/06* (2013.01); *G02B 27/0025* (2013.01)

(58) Field of Classification Search
CPC .. G02B 13/0045; G02B 9/64; G02B 27/0025; G02B 13/18; G02B 13/04; G02B 5/005; G02B 13/06; G02B 13/002; G02B 13/006
USPC ................................ 359/708, 740, 751, 755
See application file for complete search history.

(56) References Cited

U.S. PATENT DOCUMENTS 3,576,360 A * 4/1971 Shimizu ................. G02B 13/04
   359/751
4,046,459 A * 9/1977 Kawamura ............ G02B 13/04
   359/751

(Continued)

FOREIGN PATENT DOCUMENTS

| CN | 107193114 A | 9/2017 |
|---|---|---|
| CN | 206505215 U | 9/2017 |

(Continued)

*Primary Examiner* — Evelyn A Lester
(74) *Attorney, Agent, or Firm* — McClure, Qualey & Rodack, LLP

(57) ABSTRACT

A lens device consists essentially of a first lens, a second lens, a third lens, a fourth lens, a fifth lens, a sixth lens, and a seventh lens. The first lens is with negative refractive power and includes a convex surface facing an object side and a concave surface facing an image side. The second lens is a biconcave lens with negative refractive power. The third lens is with positive refractive power. The fourth lens includes a concave surface facing the object side. The fifth lens is with refractive power and includes a convex surface facing the object side. The sixth lens is with refractive power. The seventh lens is with positive refractive power. The first, second, third, fourth, fifth, sixth, and seventh lenses are arranged in order from the object side to the image side along an optical axis. The third lens and the fourth lens are cemented.

20 Claims, 28 Drawing Sheets

(51) Int. Cl.
*G02B 27/00* (2006.01)
*G02B 13/04* (2006.01)

(56) References Cited

U.S. PATENT DOCUMENTS

| | | | | |
|---|---|---|---|---|
| 5,666,228 | A * | 9/1997 | Yamamoto | G02B 15/142 |
| | | | | 359/651 |
| 7,502,179 | B2 * | 3/2009 | Kang | G02B 13/16 |
| | | | | 359/749 |
| 8,018,663 | B2 * | 9/2011 | Ohashi | G02B 13/04 |
| | | | | 359/793 |
| 8,587,878 | B2 * | 11/2013 | Ohashi | G02B 13/0045 |
| | | | | 359/753 |
| 9,213,219 | B2 * | 12/2015 | Kuzuhara | G02B 9/64 |
| 10,564,395 | B2 | 2/2020 | Jia et al. | |
| 2008/0291542 | A1 * | 11/2008 | Yamamoto | G02B 13/16 |
| | | | | 359/651 |
| 2010/0157444 | A1 * | 6/2010 | Wang | G02B 13/16 |
| | | | | 359/716 |
| 2010/0277816 | A1 * | 11/2010 | Kweon | G02B 13/06 |
| | | | | 359/755 |
| 2012/0113532 | A1 * | 5/2012 | Lee | G02B 13/06 |
| | | | | 359/753 |
| 2013/0235467 | A1 * | 9/2013 | Heu | G02B 13/18 |
| | | | | 359/684 |
| 2014/0002910 | A1 * | 1/2014 | Roth | G02B 13/04 |
| | | | | 359/740 |
| 2014/0029119 | A1 * | 1/2014 | Chou | G02B 9/04 |
| | | | | 359/717 |
| 2016/0202452 | A1 * | 7/2016 | Kuo | G02B 27/0025 |
| | | | | 359/708 |
| 2017/0184823 | A1 * | 6/2017 | Jiang | G02B 13/18 |
| 2018/0120544 | A1 | 5/2018 | Chiang et al. | |
| 2020/0081226 | A1 * | 3/2020 | Lee | G02B 13/005 |

FOREIGN PATENT DOCUMENTS

| | | |
|---|---|---|
| CN | 109219766 A | 1/2019 |
| JP | 2014102291 A | 6/2014 |
| WO | 2017213109 A1 | 12/2017 |
| WO | 2017213110 A1 | 12/2017 |

\* cited by examiner

LENS DEVICE

BACKGROUND OF THE INVENTION

Field of the Invention

The invention relates to a lens device.

Description of the Related Art

The current development trend of a lens device is toward large field of view. Additionally, the lens device is developed to have small distortion and resistance to environmental temperature change in accordance with different application requirements. However, the known lens device can't satisfy such requirements. Therefore, the lens device needs a new structure in order to meet the requirements of large field of view, small distortion, and resistance to environmental temperature change at the same time.

BRIEF SUMMARY OF THE INVENTION

The invention provides a lens device to solve the above problems. The lens device of the invention is provided with characteristics of a larger field of view, a smaller distortion, a resistance to environmental temperature change, and still has a good optical performance.

The lens device in accordance with an exemplary embodiment of the invention consists essentially of a first lens, a second lens, a third lens, a fourth lens, a fifth lens, a sixth lens, and a seventh lens. The first lens is with negative refractive power and includes a convex surface facing an object side and a concave surface facing an image side. The second lens is a biconcave lens with negative refractive power. The third lens is with positive refractive power. The fourth lens is with refractive power and includes a concave surface facing the object side. The fifth lens is with refractive power and includes a convex surface facing the object side. The sixth lens is with refractive power. The seventh lens is with positive refractive power. The first, second, third, fourth, fifth, sixth, and seventh lenses are arranged in order from the object side to the image side along an optical axis. The third lens and the fourth lens are cemented.

In another exemplary embodiment, the fourth lens is with positive refractive power and further includes a convex surface facing the image side, the fifth lens is with negative refractive power and further includes a concave surface facing the image side, and the sixth lens is a biconvex lens with positive refractive power.

The lens device in accordance with another exemplary embodiment of the invention consists essentially of a first lens, a second lens, a third lens, a fourth lens, a fifth lens, a sixth lens, and a seventh lens. The first lens is with negative refractive power and includes a convex surface facing an object side and a concave surface facing an image side. The second lens is a biconcave lens with negative refractive power. The third lens is with positive refractive power. The fourth lens is with negative refractive power and includes a concave surface facing the object side and another concave surface facing the image side. The fifth lens is with positive refractive power and includes a convex surface facing the object side and another convex surface facing the image side. The sixth lens is a biconcave lens with negative refractive power. The seventh lens is with positive refractive power. The first, second, third, fourth, fifth, sixth, and seventh lenses are arranged in order from the object side to the image side along an optical axis.

In another exemplary embodiment, the lens device satisfies: $f_1 + f_2 < -6$ mm; wherein $f_1$ is an effective focal length of the first lens and $f_2$ is an effective focal length of the second lens.

In yet another exemplary embodiment, the lens device satisfies: $CTE_1 + CTE_2 > 50 \times 10^{-6}/°$ C.; wherein $CTE_1$ is a coefficient of thermal expansion of the first lens and $CTE_2$ is a coefficient of thermal expansion of the second lens.

In another exemplary embodiment, the lens device satisfies: $80 < Vd_1 + Vd_2 < 140$; wherein $Vd_1$ is an Abbe number of the first lens and $Vd_2$ is an Abbe number of the second lens.

In yet another exemplary embodiment, the third lens and the fourth lens are cemented.

In another exemplary embodiment, the fifth lens and the sixth lens are cemented.

In yet another exemplary embodiment, the lens device further includes a stop disposed between the fourth lens and the fifth lens.

In another exemplary embodiment, the third lens is a biconvex lens.

In yet another exemplary embodiment, the seventh lens is a biconvex lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
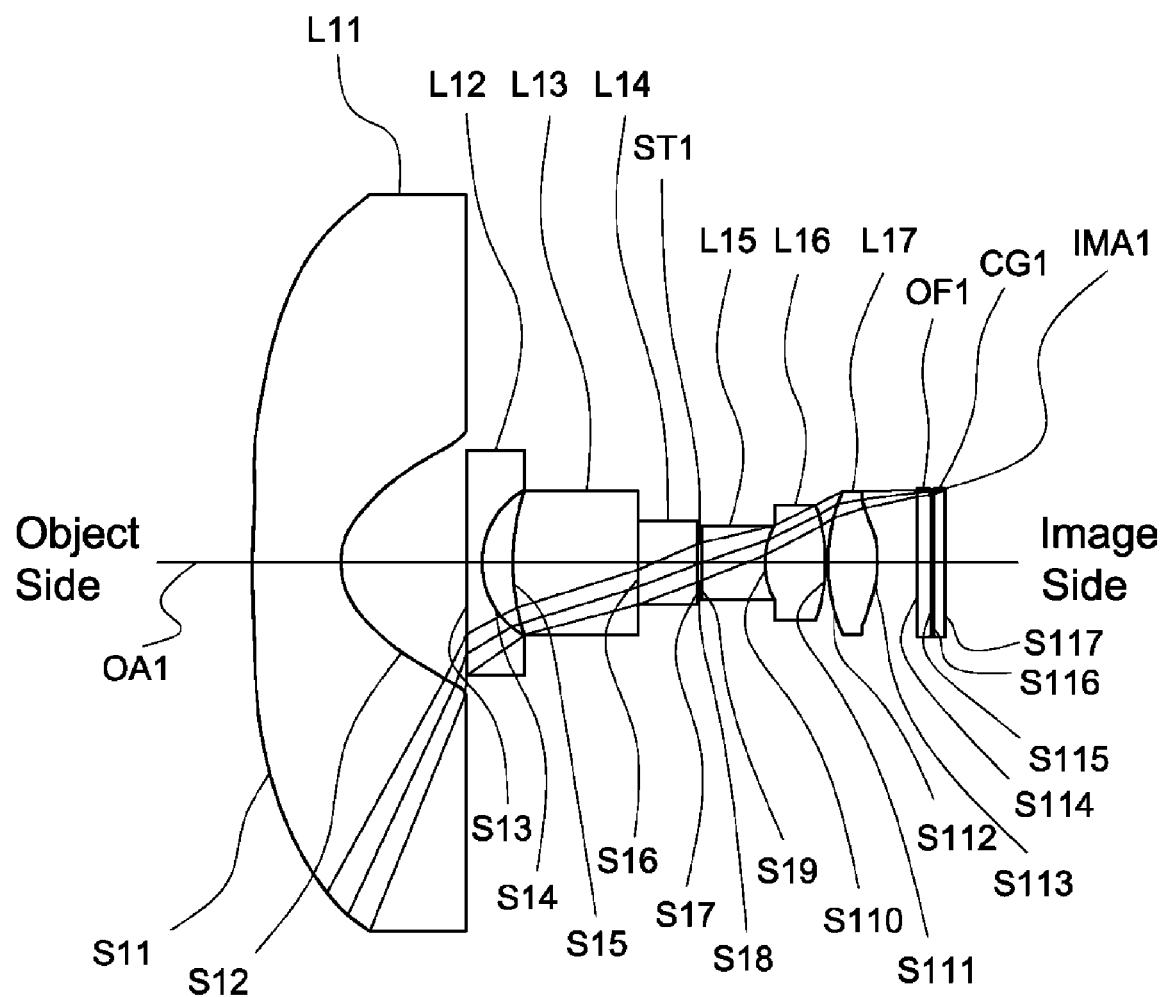
FIG. 1 is a lens layout and optical path diagram of a lens device in accordance with a first embodiment of the invention.

The following description is made for the purpose of illustrating the general principles of the invention and should not be taken in a limiting sense. The scope of the invention is best determined by reference to the appended claims.

The present invention provides a lens device consisting essentially of a first lens, a second lens, a third lens, a fourth lens, a fifth lens, a sixth lens, and a seventh lens. The first lens is with negative refractive power and includes a convex surface facing an object side and a concave surface facing an image side. The second lens is a biconcave lens with negative refractive power. The third lens is with positive refractive power. The fourth lens is with refractive power and includes a concave surface facing the object side. The fifth lens is with refractive power and includes a convex surface facing the object side. The sixth lens is with refractive power. The seventh lens is with positive refractive power. The first lens, the second lens, the third lens, the fourth lens, the fifth lens, the sixth lens, and the seventh lens are arranged in order from the object side to the image side along an optical axis. The third lens and the fourth lens are cemented.

The present invention provides another lens device consisting essentially of a first lens, a second lens, a third lens, a fourth lens, a fifth lens, a sixth lens, and a seventh lens. The first lens is with negative refractive power and includes a convex surface facing an object side and a concave surface facing an image side. The second lens is a biconcave lens with negative refractive power. The third lens is with positive refractive power. The fourth lens is with negative refractive power and includes a concave surface facing the object side and another concave surface facing the image side. The fifth lens is with positive refractive power and includes a convex surface facing the object side and another convex surface facing the image side. The sixth lens is a biconcave lens with negative refractive power. The seventh lens is with positive refractive power. The first lens, the second lens, the third lens, the fourth lens, the fifth lens, the sixth lens, and the seventh lens are arranged in order from the object side to the image side along an optical axis.

In one or more embodiments of the present invention, the first lens can be made of, for example, a plastic material, the object side surface can be, for example, an aspheric surface, and the image side surface can be, for example, an aspheric surface.

In one or more embodiments of the present invention, the second lens can be made of, for example, a glass material, the object side surface can be, for example, a spherical surface, and the image side surface can be, for example, a spherical surface.

In one or more embodiments of the present invention, the third lens can be made of, for example, a glass material, the object side surface can be, for example, a spherical surface, and the image side surface can be, for example, a spherical surface.

In one or more embodiments of the present invention, the fourth lens can be made of, for example, a glass material, the object side surface can be, for example, a spherical surface, and the image side surface can be, for example, a spherical surface.

In one or more embodiments of the present invention, the third lens can be cemented, for example, with the fourth lens, thereby increasing the resolution of the lens device.

In one or more embodiments of the present invention, the fifth lens can be made of, for example, a glass material, the object side surface can be, for example, a spherical surface, and the image side surface can be, for example, a spherical surface.

In one or more embodiments of the present invention, the sixth lens can be made of, for example, a glass material, the object side surface can be, for example, a spherical surface, and the image side surface can be, for example, a spherical surface.

In one or more embodiments of the present invention, the fifth lens can be cemented, for example, with the sixth lens, thereby increasing the resolution of the lens device.

In one or more embodiments of the present invention, the object side surface of the seventh lens can be, for example, an aspheric surface and the image side surface can be, for example, an aspheric surface.

In the present invention, the aspheric surface sag z of a lens is defined by the following formula:

$$z = ch^2 / \{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In addition, the lens device satisfies at least one of the following conditions:

$$f_1 + f_2 < -6 \text{ mm}; \quad (1)$$

$$CTE_1 + CTE_2 > 50 \times 10^{-6}/^\circ C.; \quad (2)$$

$$80 < Vd_1 + Vd_2 < 140; \quad (3)$$

wherein $f_1$ is an effective focal length of the first lens, $f_2$ is an effective focal length of the second lens, $CTE_1$ is a coefficient of thermal expansion of the first lens, $CTE_2$ is a coefficient of thermal expansion of the second lens, $Vd_1$ is an Abbe number of the first lens, and $Vd_2$ is an Abbe number of the second lens. Making the lens device can effectively increase field of view, effectively decrease distortion, effectively increase resolution, effectively resistance to environmental temperature change, and effectively correct aberration.

When the condition (1): $f_1 + f_2 < -6$ mm is satisfied, the refractive power of each lens in the lens device can be distributed effectively to achieve design required and the better range of $f_1 + f_2$ is to satisfy the condition: $-16$ mm $< f_1 + f_2 < -6$ mm.

When the condition (2): $CTE_1 + CTE_2 > 50 \times 10^{-6}/^\circ$ C. is satisfied, the distortion of the lens device can be effectively reduced and the better range of $CTE_1 + CTE_2$ is to satisfy the condition: $50 \times 10^{-6}/^\circ$ C. $< CTE_1 + CTE_2 < 80 \times 10^{-6}/^\circ$ C.

When the condition (3): $80 < Vd_1 + Vd_2 < 140$ is satisfied, the resolution of the lens device can be effectively increased.

A detailed description of a lens device in accordance with various embodiments of the invention is as follows.

Referring to FIG. 1, FIG. 1 is a lens layout and optical path diagram of a lens device in accordance with a first embodiment of the invention. The lens device 1 consists essentially of a first lens L11, a second lens L12, a third lens L13, a fourth lens L14, a stop ST1, a fifth lens L15, a sixth lens L16, a seventh lens L17, an optical filter OF1, and a cover glass CG1, all of which are arranged in order from an object side to an image side along an optical axis OA1. In operation, an image of light rays from the object side is formed at an image plane IMA1.

The first lens L11 is, for example, a meniscus lens, wherein the object side surface S11 is a convex surface and the image side surface S12 is a concave surface. The first lens L11 has, for example, a negative refractive power.

The second lens L12 is, for example, a biconcave lens, wherein the object side surface S13 is a concave surface and the image side surface S14 is a concave surface. Both of the object side surface S13 and the image side surface S14 are, for example, spherical surfaces. The second lens L12 has, for example, a negative refractive power and is made of, for example, a glass material.

The third lens L13 is, for example, a biconvex lens, wherein the object side surface S15 is a convex surface and the image side surface S16 is a convex surface. Both of the object side surface S15 and the image side surface S16 are, for example, spherical surfaces. The third lens L13 has, for example, a positive refractive power and is made of, for example, a glass material.

The fourth lens L14 is, for example, a meniscus lens, wherein the object side surface S16 is a concave surface and the image side surface S17 is a convex surface. Both of the object side surface S16 and the image side surface S17 are, for example, spherical surfaces. The fourth lens L14 has, for example, a positive refractive power.

The fifth lens L15 is, for example, a meniscus lens, wherein the object side surface S19 is a convex surface and the image side surface S110 is a concave surface. Both of the object side surface S19 and the image side surface S110 are, for example, spherical surfaces. The fifth lens L15 has, for example, a negative refractive power and is made of, for example, a glass material.

The sixth lens L16 is, for example, a biconvex lens, wherein the object side surface S110 is a convex surface and the image side surface S111 is a convex surface. Both of the object side surface S110 and the image side surface S111 are, for example, spherical surfaces. The sixth lens L16 has, for example, a positive refractive power and is made of, for example, a glass material.

The seventh lens L17 is, for example, a biconvex lens, wherein the object side surface S112 is a convex surface and the image side surface S113 is a convex surface. The seventh lens L17 has, for example, a positive refractive power and is made of, for example, a glass material.

Both of the object side surface S114 and image side surface S115 of the optical filter OF1 are plane surfaces.

Both of the object side surface S116 and image side surface S117 of the cover glass CG1 are plane surfaces.

With the above design of the lenses and stop ST1 and at least any one of the conditions (1)-(3) satisfied, the lens device 1 can have an effective increased field of view, an effective decreased distortion, an effective increased resolution, an effective resisted environmental temperature change, and is capable of an effective corrected aberration.

Table 1 shows the optical specification of the lens device 1 in FIG. 1.

TABLE 1

Effective Focal Length = 0.968 mm F-number = 2.6
Total Lens Length = 30.0 mm Field of View = 149.2 Degrees

| Surface Number | Radius of Curvature (mm) | Thickness (mm) | Nd | Vd | Remark |
|---|---|---|---|---|---|
| S11 | 533.917 | 3.82 | 1.531 | 55.830 | The First Lens L11 |
| S12 | 2.744 | 5.49 | | | |
| S13 | −942.706 | 0.65 | 1.741 | 52.636 | The Second Lens L12 |
| S14 | 3.695 | 1.33 | | | |
| S15 | 9.917 | 5.50 | 1.946 | 17.984 | The Third Lens L13 |
| S16 | −44.490 | 2.53 | 1.595 | 67.736 | The Fourth Lens L14 |
| S17 | −8.342 | 0.01 | | | |
| S18 | ∞ | 0.10 | | | Stop ST1 |
| S19 | 9.013 | 2.77 | 1.946 | 17.984 | The Fifth Lens L15 |
| S110 | 3.379 | 2.68 | 1.595 | 67.736 | The Sixth Lens L16 |
| S111 | −6.493 | 0.05 | | | |
| S112 | 8.802 | 2.17 | 1.595 | 67.736 | The Seventh Lens L17 |
| S113 | −4.186 | 1.72 | | | |
| S114 | ∞ | 0.55 | 1.517 | 61.167 | Optical Filter OF1 |
| S115 | ∞ | 0.20 | | | |
| S116 | ∞ | 0.45 | 1.517 | 61.167 | Cover Glass CG1 |
| S117 | ∞ | 0.00 | | | |

In the first embodiment, the conic constant k and the aspheric coefficients A, B, C, D, E, F, G of each surface are shown in Table 2.

TABLE 2

| Surface Number | k | A E | B F | C G | D |
|---|---|---|---|---|---|
| S11 | −7.27E+05 | 2.08E−04 | −2.20E−06 | 1.86E−08 | −1.04E−10 |
|  |  | 3.73E−13 | −7.82E−16 | 7.47E−19 |  |
| S12 | −7.89E−01 | −2.21E−03 | 7.28E−05 | −3.32E−06 | 4.33E−09 |
|  |  | 1.21E−09 | 2.89E−11 | −2.26E−12 |  |
| S112 | 3.72E+00 | −2.28E−03 | 3.63E−04 | −1.88E−05 | −7.40E−06 |
|  |  | 1.04E−06 | −1.26E−09 | −2.49E−09 |  |
| S113 | −4.60E−01 | 6.59E−03 | −5.26E−04 | 8.74E−05 | −6.61E−06 |
|  |  | −5.63E−07 | 1.17E−07 | −3.45E−09 |  |

Table 3 shows the parameters and condition values for conditions (1)-(3) in accordance with the first embodiment of the invention. It can be seen from Table 3 that the lens device 1 of the first embodiment satisfies the conditions (1)-(3).

TABLE 3

| $f_1$ | −5.186 mm | $f_2$ | −4.948 mm | $f_3$ | 8.93 mm |
|---|---|---|---|---|---|
| $f_4$ | 16.763 mm | $f_5$ | −7.452 mm | $f_6$ | 4.144 mm |
| $f_7$ | 5.569 mm | $CTE_1$ | 59 × 10$^{-6}$/° C. | $CTE_2$ | 5.7 × 10$^{-6}$/° C. |
| $CTE_3$ | 5.7 × 10$^{-6}$/° C. | $CTE_4$ | 11.7 × 10$^{-6}$/° C. | $CTE_5$ | 5.7 × 10$^{-6}$/° C. |
| $CTE_6$ | 11.7 × 10$^{-6}$/° C. | $CTE_7$ | 11.7 × 10$^{-6}$/° C. | $f_1 + f_2$ | −10.134 mm |
| $CTE_1 + CTE_2$ | 64.7 × 10$^{-6}$/° C. | $Vd_1 + Vd_2$ | 108.466 |  |  |

Figure 2A:
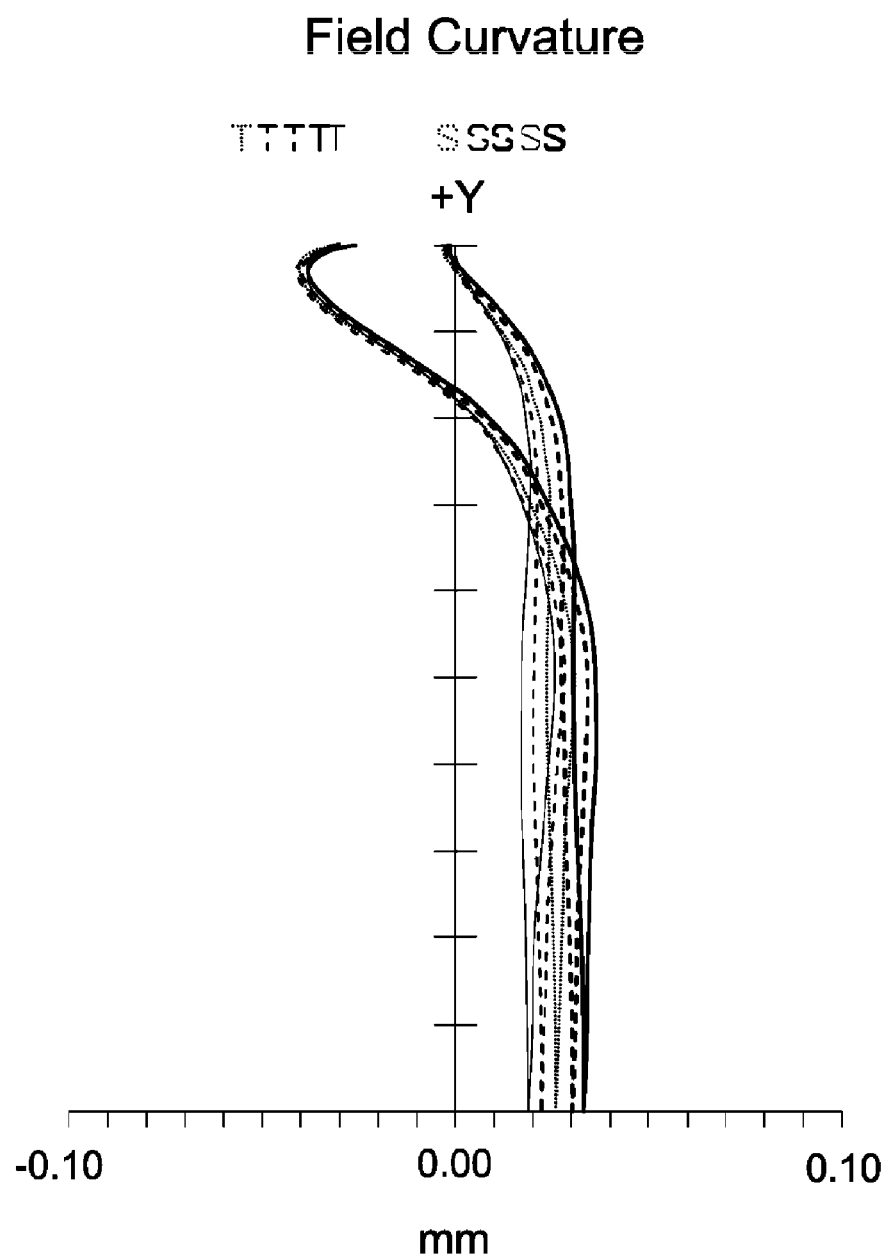
FIG. 2A depicts a field curvature diagram of the lens device in accordance with the first embodiment of the invention.
Figure 2B:
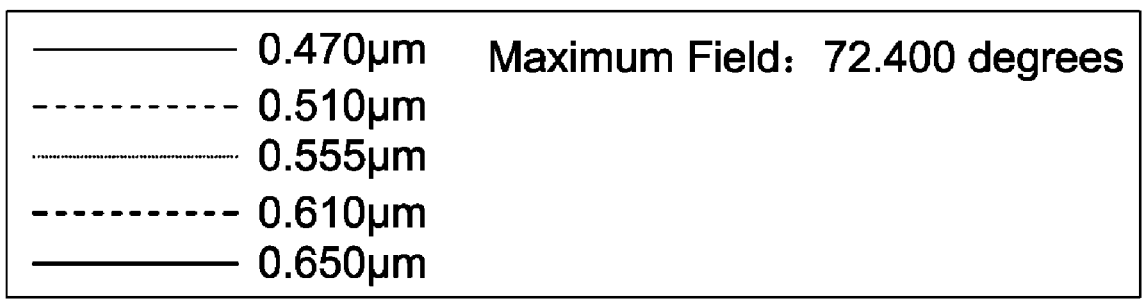
FIG. 2B is a distortion diagram of the lens device in accordance with the first embodiment of the invention.
Figure 2B:
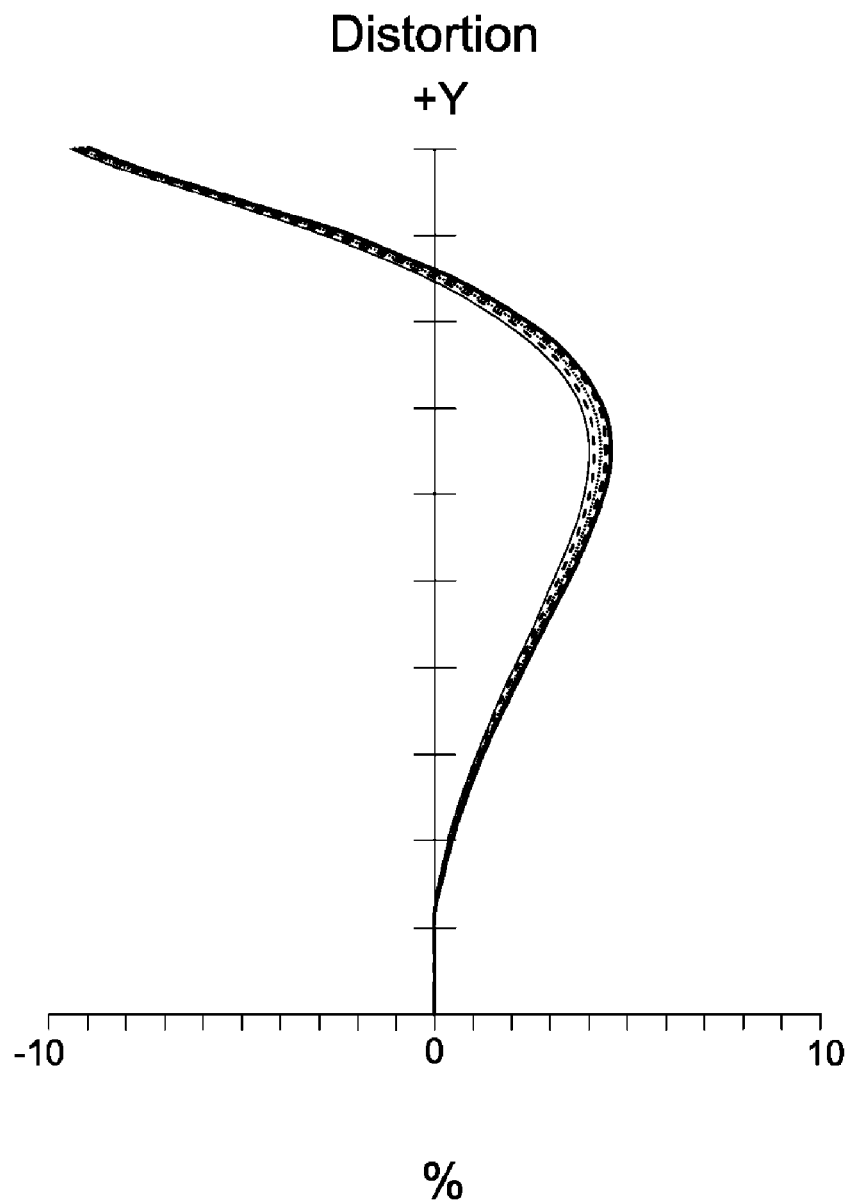
Figure 2C:
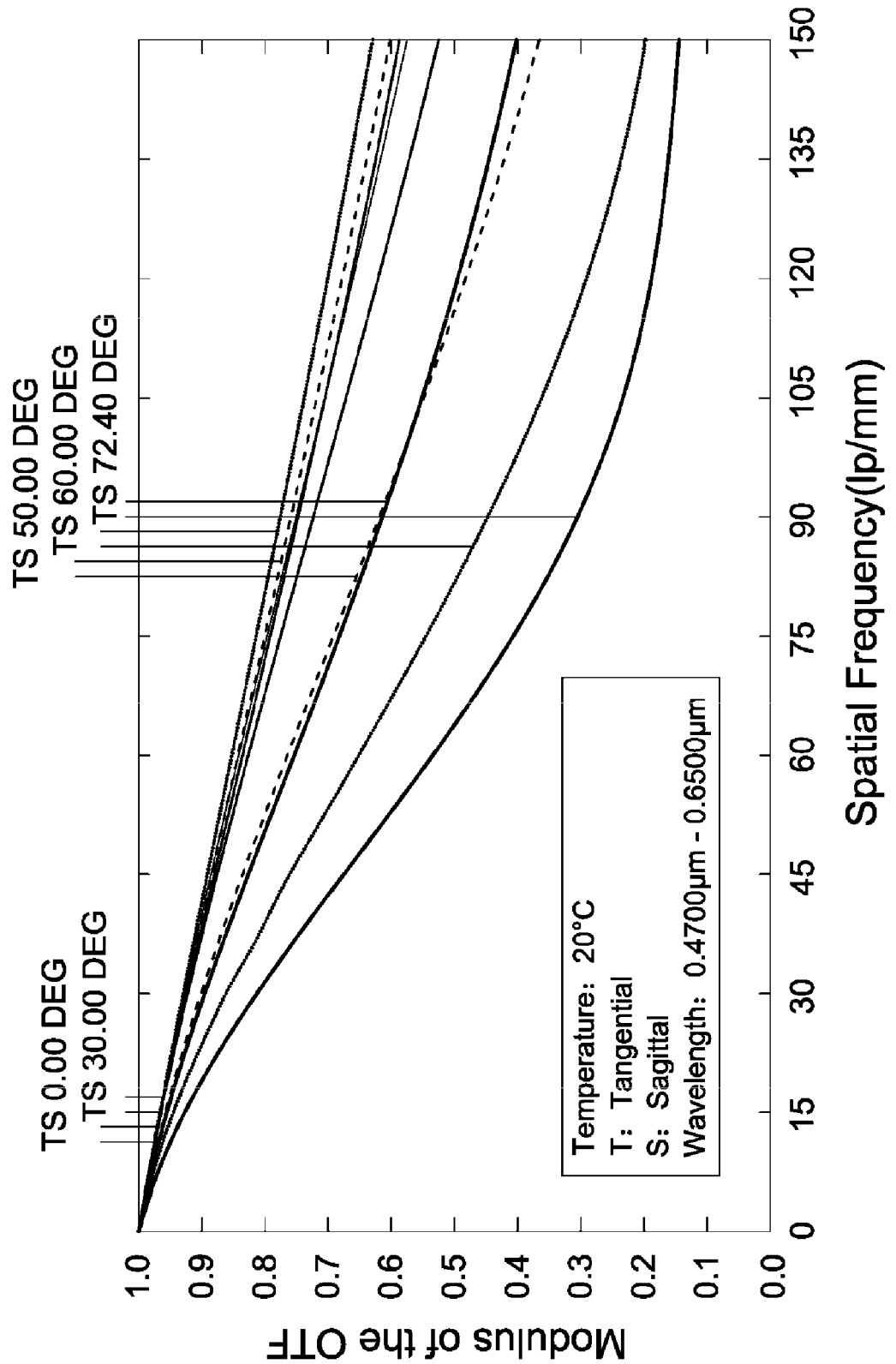
FIG. 2C is a modulation transfer function diagram as temperature is equal to 20° C. for the lens device in accordance with the first embodiment of the invention.
Figure 2D:
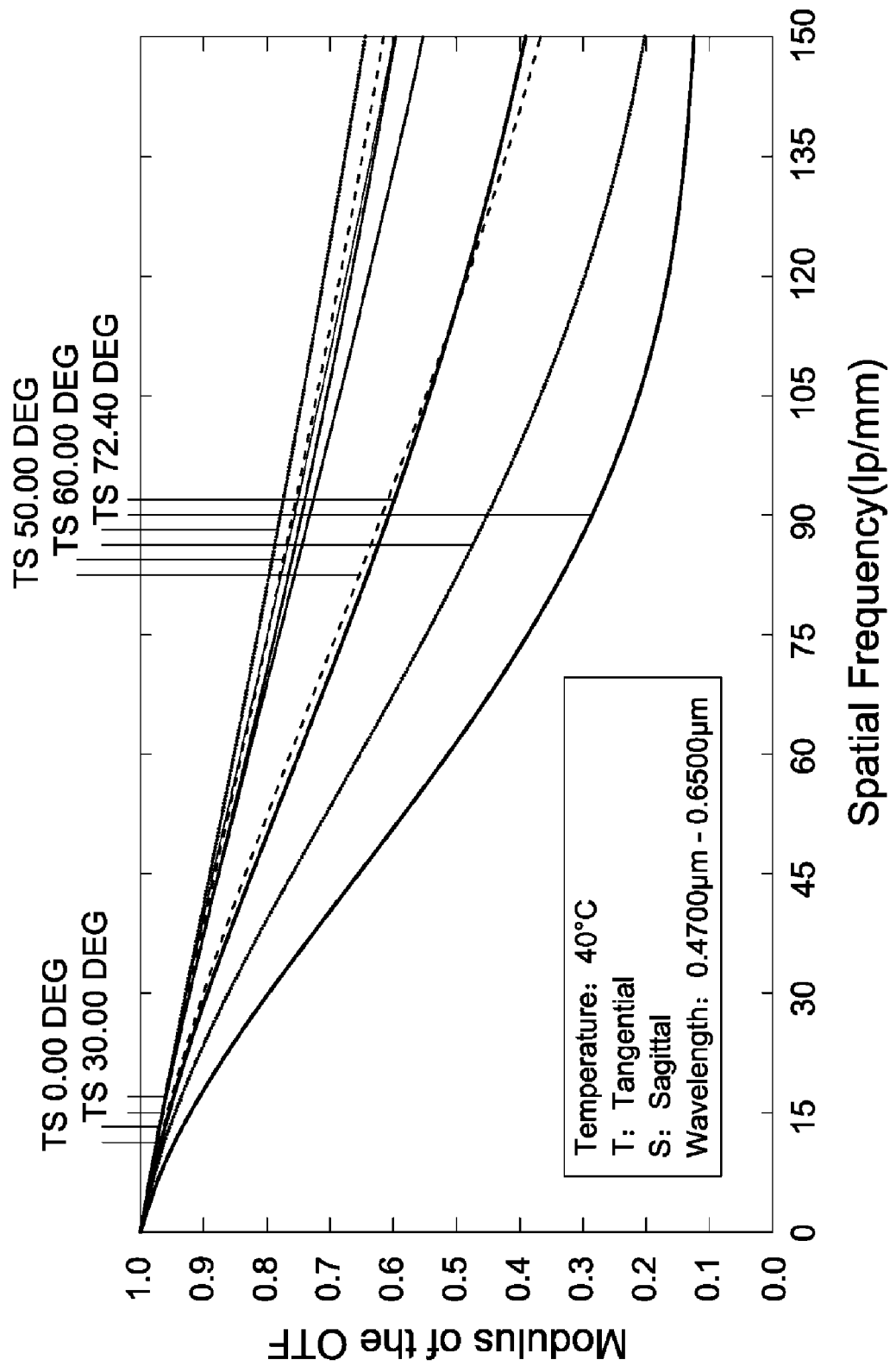
FIG. 2D is a modulation transfer function diagram as temperature is equal to 40° C. for the lens device in accordance with the first embodiment of the invention.
Figure 2E:
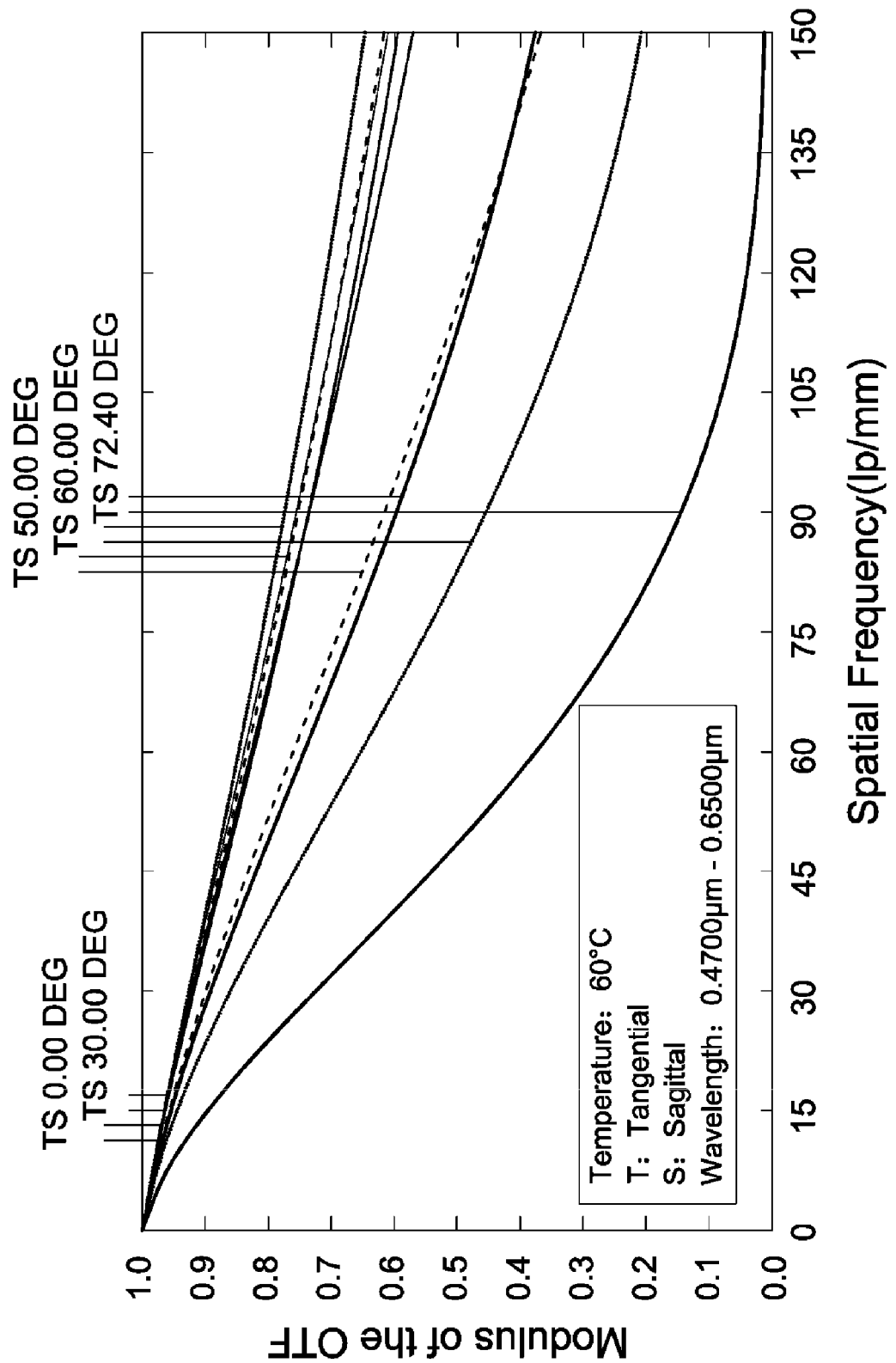
FIG. 2E is a modulation transfer function diagram as temperature is equal to 60° C. for the lens device in accordance with the first embodiment of the invention.
Figure 2F:
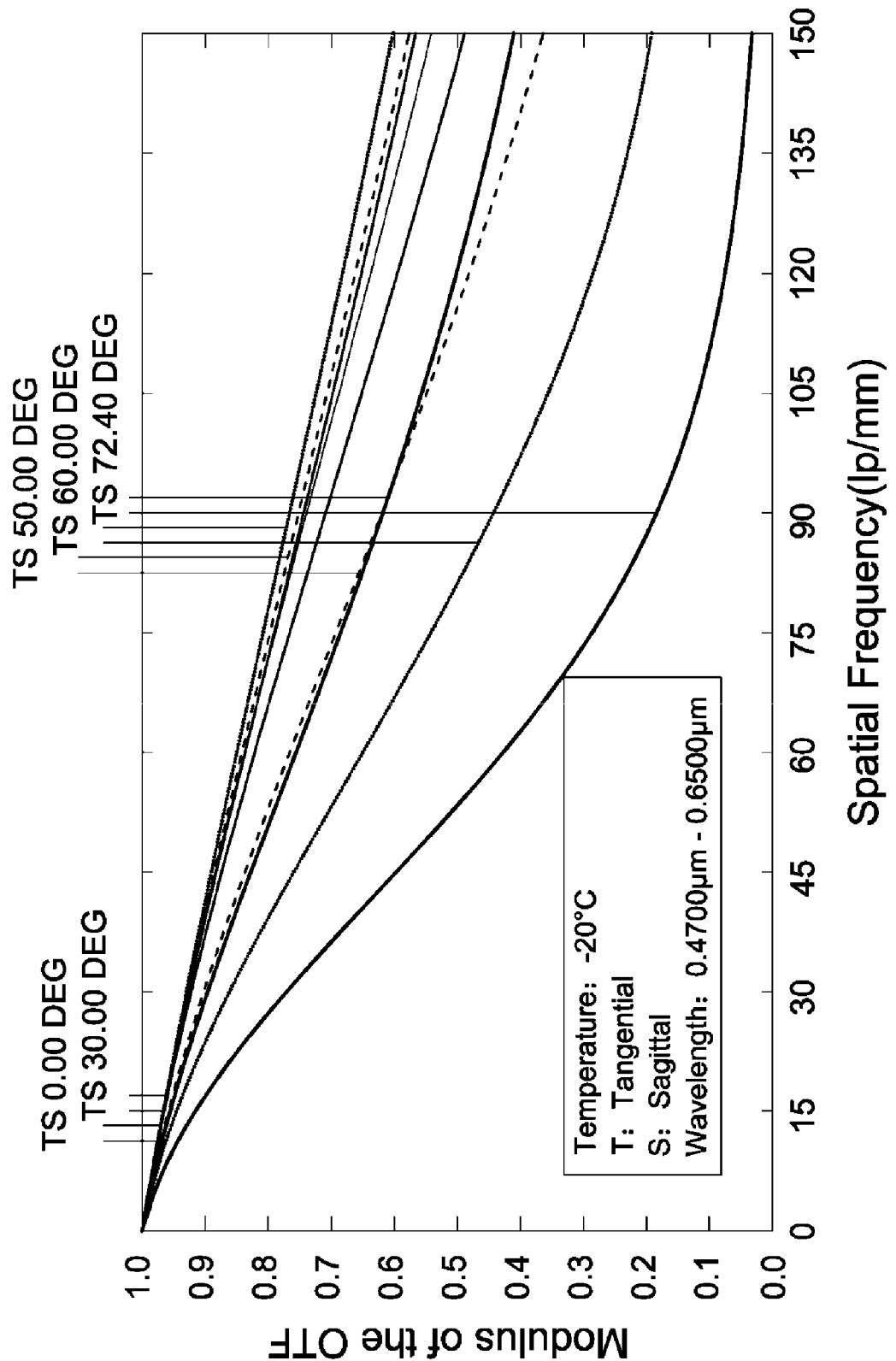
FIG. 2F is a modulation transfer function diagram as temperature is equal to −20° C. for the lens device in accordance with the first embodiment of the invention.

By the above arrangements of the lenses and stop ST1, the lens device 1 of the first embodiment can meet the requirements of optical performance as seen in FIGS. 2A-2F, wherein FIG. 2A shows a field curvature diagram of the lens device 1 in accordance with the first embodiment of the invention, FIG. 2B shows a distortion diagram of the lens device 1 in accordance with the first embodiment of the invention, FIG. 2C shows a modulation transfer function diagram as temperature is equal to 20° C. for the lens device 1 in accordance with the first embodiment of the invention, FIG. 2D shows a modulation transfer function diagram as temperature is equal to 40° C. for the lens device 1 in accordance with the first embodiment of the invention, FIG. 2E shows a modulation transfer function diagram as temperature is equal to 60° C. for the lens device 1 in accordance with the first embodiment of the invention, and FIG. 2F shows a modulation transfer function diagram as temperature is equal to −20° C. for the lens device 1 in accordance with the first embodiment of the invention.

It can be seen from FIG. 2A that the field curvature of tangential direction and sagittal direction in the lens device 1 of the first embodiment ranges from −0.045 mm to 0.040 mm.

It can be seen from FIG. 2B that the distortion in the lens device 1 of the first embodiment ranges from −10% to 5%.

It can be seen from FIGS. 2C-2F that the modulation transfer function of tangential direction and sagittal direction in the lens device 1 of the first embodiment ranges from 0.14 to 1.0, 0.12 to 1.0, 0.01 to 1.0, and 0.13 to 1.0 as temperature is equal to 20° C., 40° C., 60° C., and −20° C. respectively.

It is obvious that the field curvature and the distortion of the lens device 1 of the first embodiment can be corrected effectively, and the resolution of the lens device 1 of the first embodiment can meet the requirement. Therefore, the lens device 1 of the first embodiment is capable of good optical performance.

Figure 3:
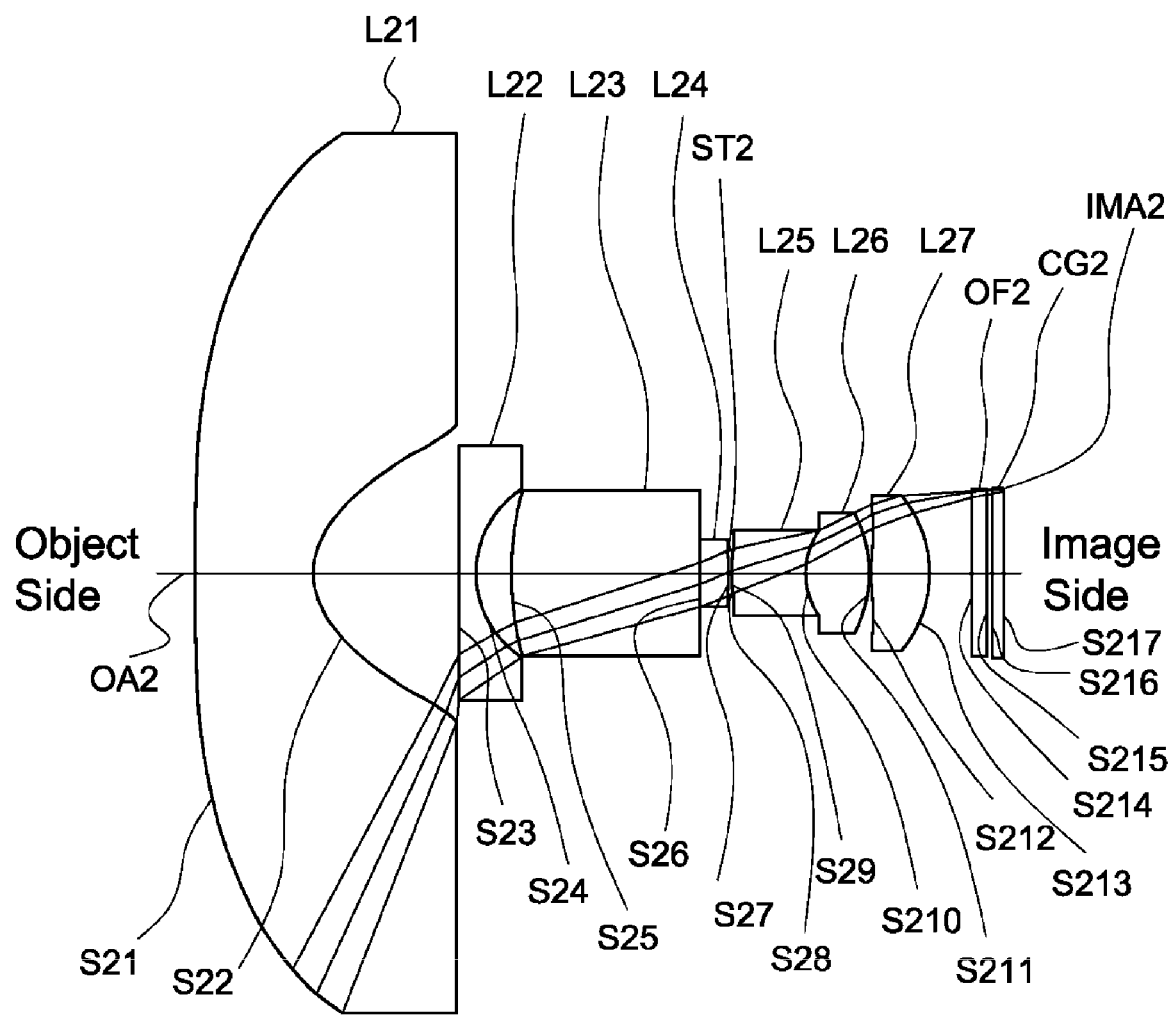
FIG. 3 is a lens layout and optical path diagram of a lens device in accordance with a second embodiment of the invention.

Referring to FIG. 3, FIG. 3 is a lens layout and optical path diagram of a lens device in accordance with a second embodiment of the invention. The lens device 2 consists essentially of a first lens L21, a second lens L22, a third lens L23, a fourth lens L24, a stop ST2, a fifth lens L25, a sixth lens L26, a seventh lens L27, an optical filter OF2, and a cover glass CG2, all of which are arranged in order from an object side to an image side along an optical axis OA2. In operation, an image of light rays from the object side is formed at an image plane IMA2.

The surface profile and sign of the refractive power of the first lens L21, the second lens L22, the third lens L23, the fourth lens L24, the fifth lens L25, the sixth lens L26, the seventh lens L27, the optical filter OF2, and the cover glass CG2 approximate to the first lens L11, the second lens L12, the third lens L13, the fourth lens L14, the fifth lens L15, the sixth lens L16, the seventh lens L17, the optical filter OF1, and the cover glass CG1 of the lens device 1 of the first embodiment and the material of the first lens L21 to the sixth lens L26 are similar to the first lens L11 to the sixth lens L16 of the lens device 1 of the first embodiment respectively, so that both of which are not described here again.

The seventh L27 is made of, for example, a plastic material.

With the above design of the lenses and stop ST2 and at least any one of the conditions (1)-(3) satisfied, the lens device 2 can have an effective increased field of view, an effective decreased distortion, an effective increased resolution, an effective resisted environmental temperature change, and is capable of an effective corrected aberration.

Table 4 shows the optical specification of the lens device 2 in FIG. 3.

TABLE 4

Effective Focal Length = 0.966 mm F-number = 2.6
Total Lens Length = 30.0 mm Field of View = 149.2 Degrees

| Surface Number | Radius of Curvature (mm) | Thickness (mm) | Nd | Vd | Remark |
|---|---|---|---|---|---|
| S21 | 142.565 | 4.38 | 1.532 | 55.839 | The First Lens L21 |
| S22 | 2.685 | 5.38 |  |  |  |
| S23 | −1332.836 | 0.65 | 1.595 | 67.736 | The Second Lens L22 |
| S24 | 3.692 | 1.31 |  |  |  |
| S25 | 11.434 | 7.00 | 1.846 | 23.780 | The Third Lens L23 |
| S26 | −103.734 | 1.06 | 1.595 | 67.736 | The Fourth Lens L24 |
| S27 | −10.270 | 0.01 |  |  |  |

TABLE 4-continued

Effective Focal Length = 0.966 mm F-number = 2.6
Total Lens Length = 30.0 mm Field of View = 149.2 Degrees

| Surface Number | Radius of Curvature (mm) | Thickness (mm) | Nd | Vd | Remark |
|---|---|---|---|---|---|
| S28 | ∞ | 0.09 | | | Stop ST2 |
| S29 | 6.603 | 2.76 | 1.846 | 23.780 | The Fifth Lens L25 |
| S210 | 2.908 | 2.37 | 1.595 | 67.736 | The Sixth Lens L26 |
| S211 | −4.433 | 0.05 | | | |
| S212 | 13.629 | 2.16 | 1.518 | 62.817 | The Seventh Lens L27 |
| S213 | −4.227 | 1.57 | | | |
| S214 | ∞ | 0.55 | 1.517 | 61.167 | Optical Filter OF2 |
| S215 | ∞ | 0.20 | | | |
| S216 | ∞ | 0.45 | 1.517 | 61.167 | Cover Glass CG2 |
| S217 | ∞ | 0.00 | | | |

In the second embodiment, the conic constant k and the aspheric coefficients A, B, C, D, E, F, G of each surface are shown in Table 5.

TABLE 5

| Surface Number | k | A<br>E | B<br>F | C<br>G | D |
|---|---|---|---|---|---|
| S21 | −2.41E+04 | 2.15E−04<br>3.73E−13 | −2.26E−06<br>−7.84E−16 | 1.87E−08<br>7.43E−19 | −1.04E−10 |
| S22 | −7.90E−01 | −2.28E−03<br>1.09E−09 | 8.45E−05<br>2.40E−11 | −3.52E−06<br>−2.29E−12 | −6.97E−09 |
| S212 | −8.44E+00 | −3.88E−03<br>6.01E−07 | 5.27E−05<br>1.73E−07 | −1.63E−05<br>−9.85E−10 | −1.28E−05 |
| S213 | 1.17E−01 | 5.65E−03<br>−8.69E−07 | −9.48E−04<br>1.06E−07 | 1.07E−04<br>−5.76E−11 | −6.38E−06 |

Table 6 shows the parameters and condition values for conditions (1)-(3) in accordance with the second embodiment of the invention. It can be seen from Table 6 that the lens device 2 of the second embodiment satisfies the conditions (1)-(3).

TABLE 6

| | | | | | |
|---|---|---|---|---|---|
| $f_1$ | −5.189 mm | $f_2$ | −4.95 mm | $f_3$ | 11.11 mm |
| $f_4$ | 19.016 mm | $f_5$ | −8.564 mm | $f_6$ | 3.346 mm |
| $f_7$ | 6.317 mm | $CTE_1$ | 59 × 10$^{-6}$/° C. | $CTE_2$ | 5.7 × 10$^{-6}$/° C. |
| $CTE_3$ | 5.7 × 10$^{-6}$/° C. | $CTE_4$ | 11.7 × 10$^{-6}$/° C. | $CTE_5$ | 5.7 × 10$^{-6}$/° C. |
| $CTE_6$ | 11.7 × 10$^{-6}$/° C. | $CTE_7$ | 59 × 10$^{-6}$/° C. | $f_1 + f_2$ | −10.139 mm |
| $CTE_1 + CTE_2$ | 64.7 × 10$^{-6}$/° C. | $Vd_1 + Vd_2$ | 123.575 | | |

Figure 4A:
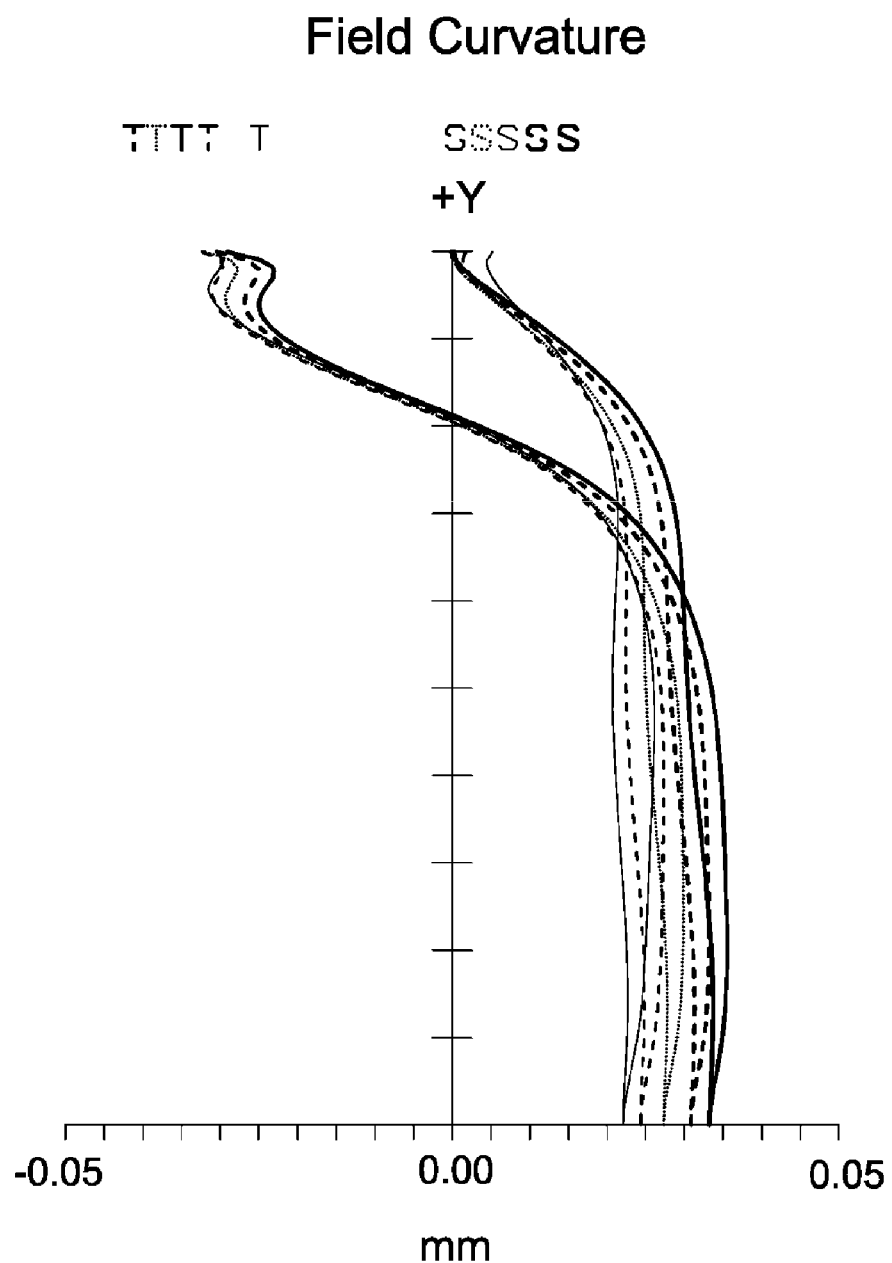
FIG. 4A depicts a field curvature diagram of the lens device in accordance with the second embodiment of the invention.
Figure 4B:
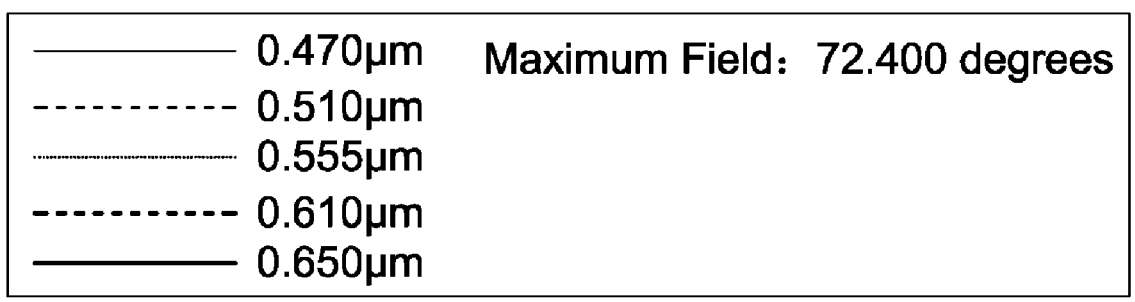
FIG. 4B is a distortion diagram of the lens device in accordance with the second embodiment of the invention.
Figure 4B:
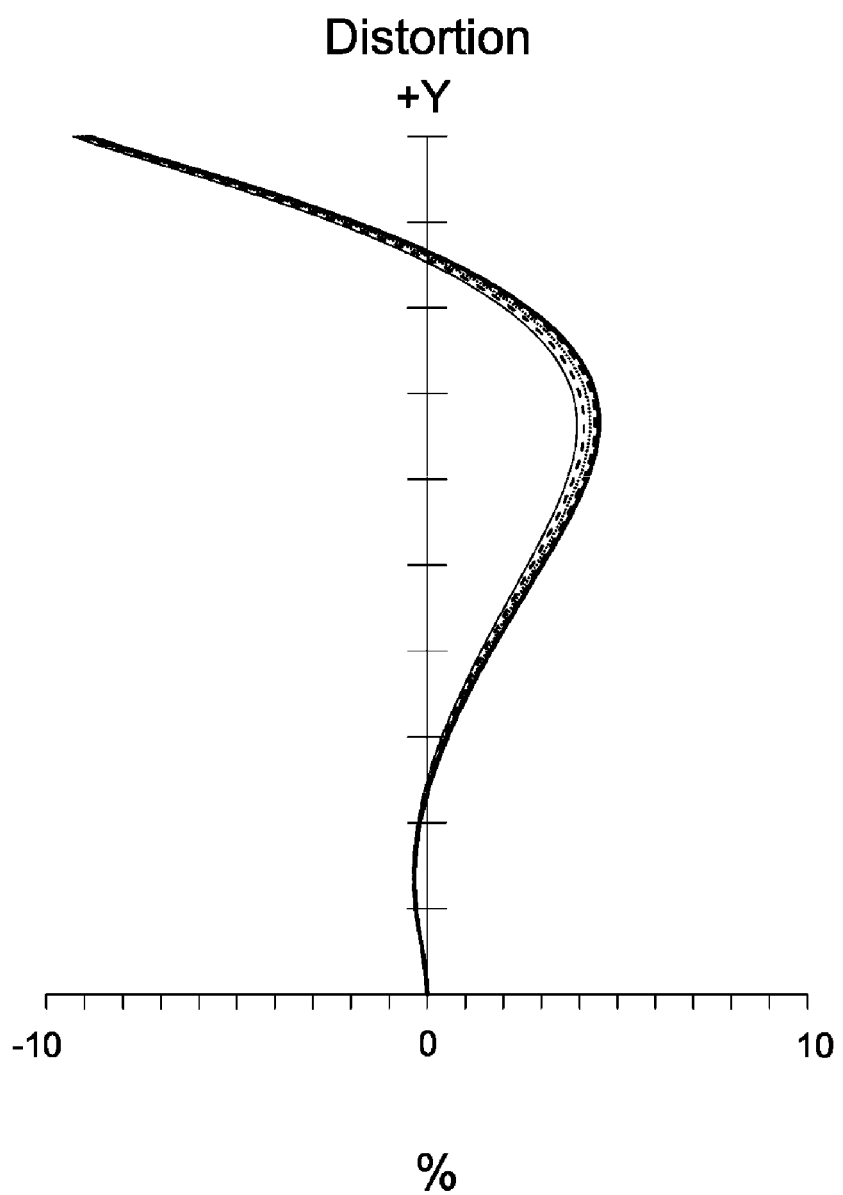
Figure 4C:
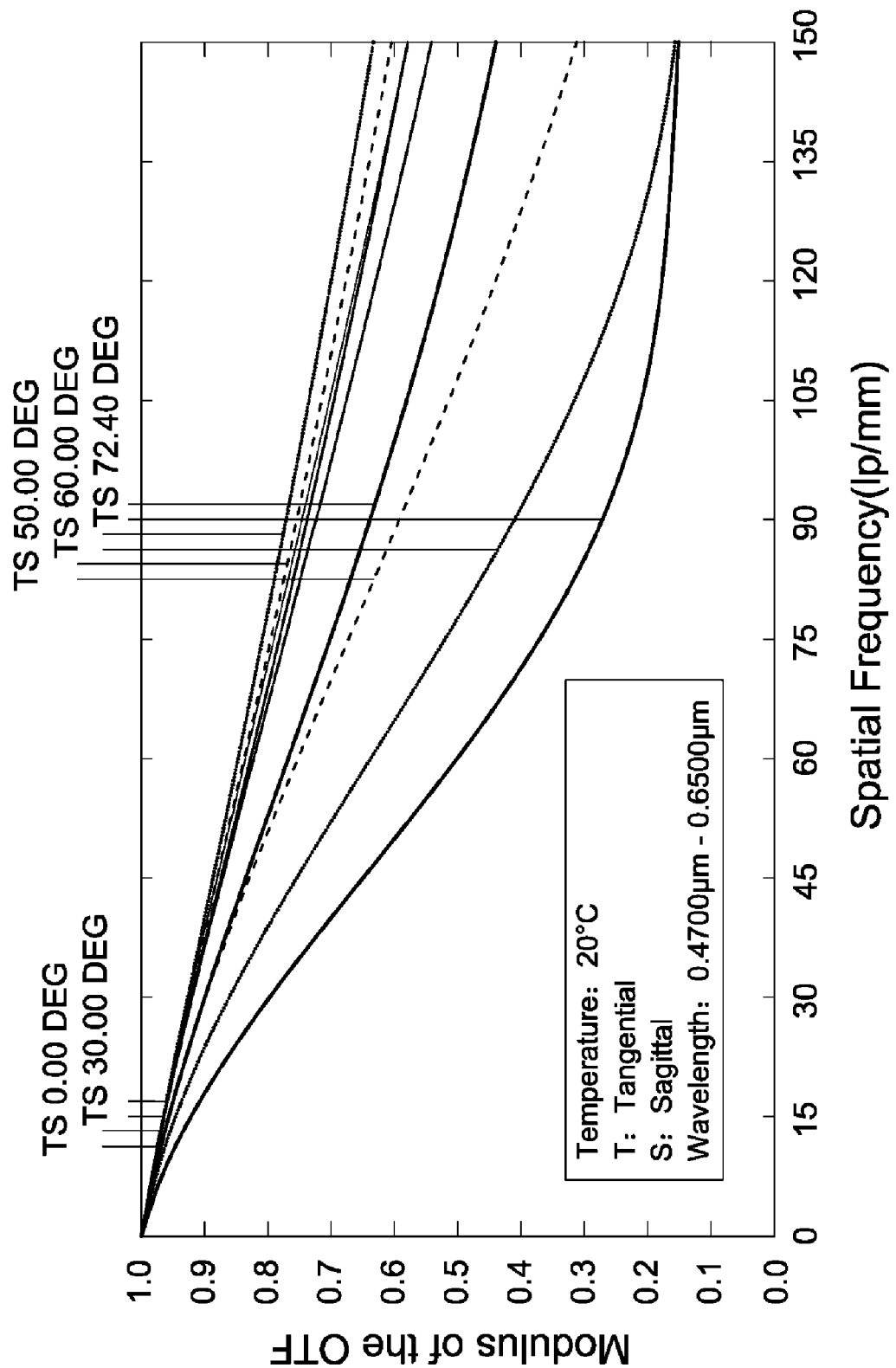
FIG. 4C is a modulation transfer function diagram as temperature is equal to 20° C. for the lens device in accordance with the second embodiment of the invention.
Figure 4D:
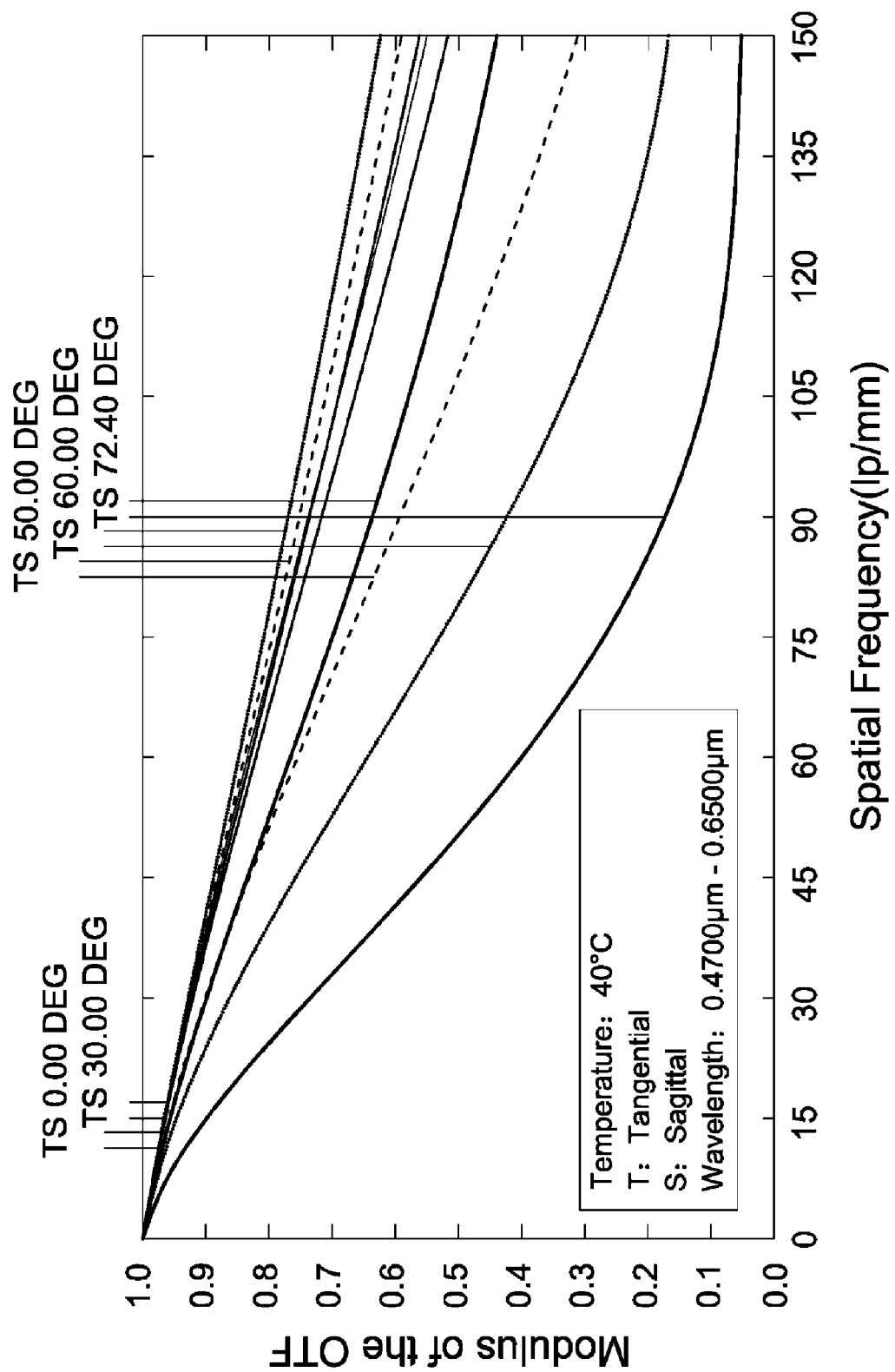
FIG. 4D is a modulation transfer function diagram as temperature is equal to 40° C. for the lens device in accordance with the second embodiment of the invention.
Figure 4E:
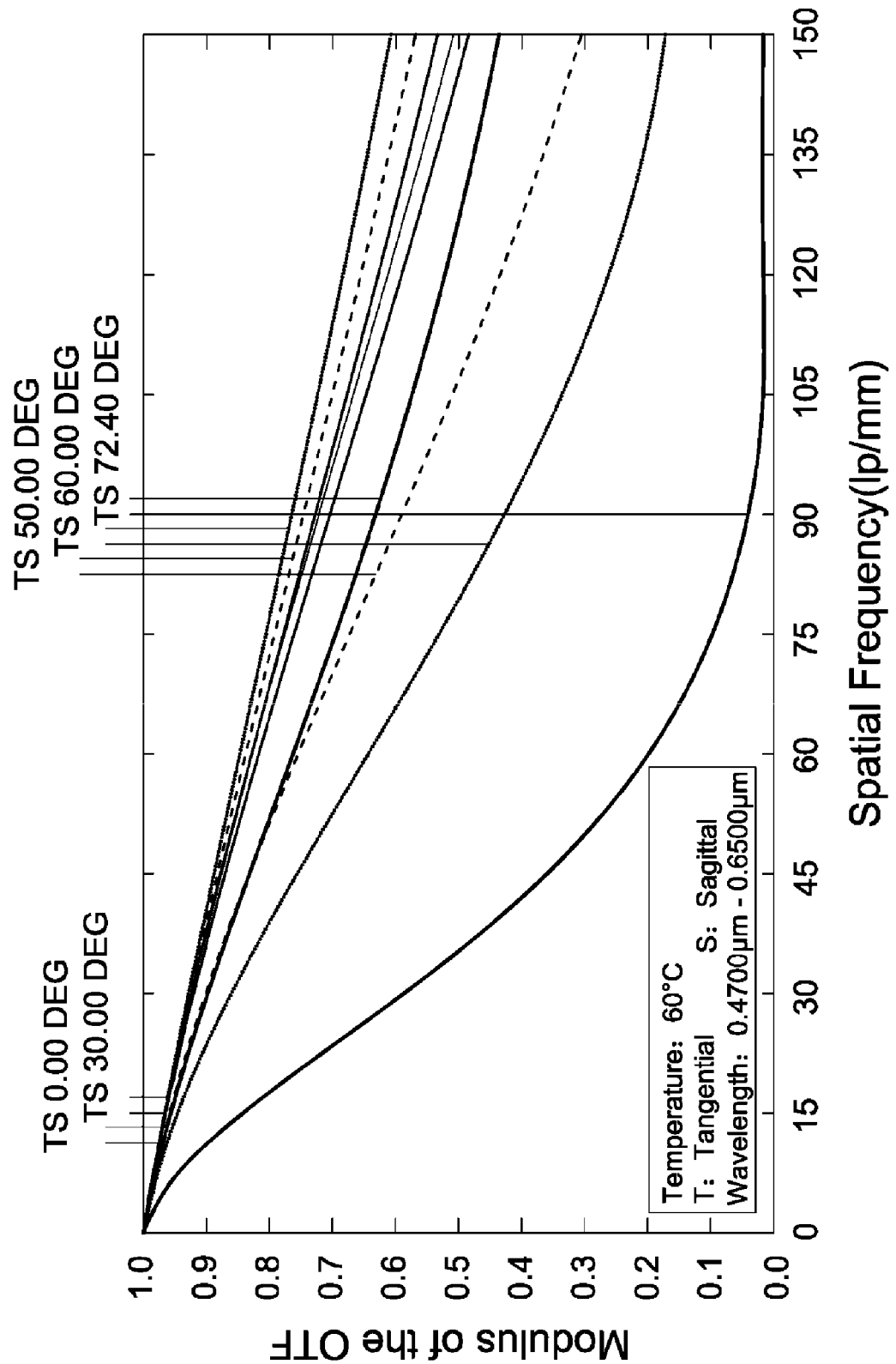
FIG. 4E is a modulation transfer function diagram as temperature is equal to 60° C. for the lens device in accordance with the second embodiment of the invention.
Figure 4F:
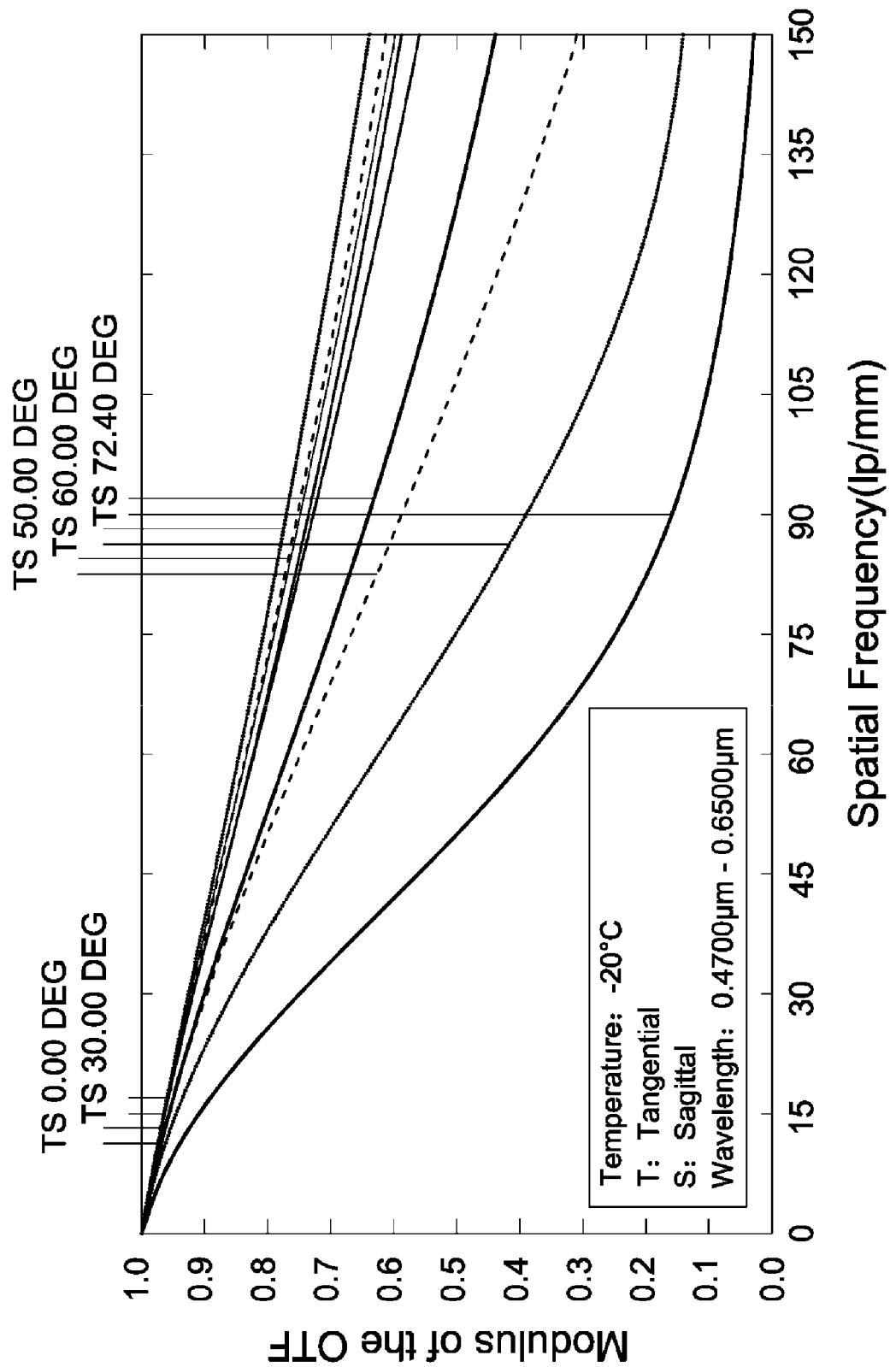
FIG. 4F is a modulation transfer function diagram as temperature is equal to −20° C. for the lens device in accordance with the second embodiment of the invention.

By the above arrangements of the lenses and stop ST2, the lens device 2 of the second embodiment can meet the requirements of optical performance as seen in FIGS. 4A-4F, wherein FIG. 4A shows a field curvature diagram of the lens device 2 in accordance with the second embodiment of the invention, FIG. 4B shows a distortion diagram of the lens device 2 in accordance with the second embodiment of the invention, FIG. 4C shows a modulation transfer function diagram as temperature is equal to 20° C. for the lens device 2 in accordance with the second embodiment of the invention, FIG. 4D shows a modulation transfer function diagram as temperature is equal to 40° C. for the lens device 2 in accordance with the second embodiment of the invention, FIG. 4E shows a modulation transfer function diagram as temperature is equal to 60° C. for the lens device 2 in accordance with the second embodiment of the invention, and FIG. 4F shows a modulation transfer function diagram as temperature is equal to −20° C. for the lens device 2 in accordance with the second embodiment of the invention.

It can be seen from FIG. 4A that the field curvature of tangential direction and sagittal direction in the lens device 2 of the second embodiment ranges from −0.035 mm to 0.040 mm.

It can be seen from FIG. 4B that the distortion in the lens device 2 of the second embodiment ranges from −10% to 5%.

It can be seen from FIGS. 4C-4F that the modulation transfer function of tangential direction and sagittal direction in the lens device 2 of the second embodiment ranges from 0.15 to 1.0, 0.05 to 1.0, 0.01 to 1.0, and 0.03 to 1.0 as temperature is equal to 20° C., 40° C., 60° C., and −20° C. respectively.

It is obvious that the field curvature and the distortion of the lens device 2 of the second embodiment can be corrected effectively, and the resolution of the lens device 2 of the second embodiment can meet the requirement. Therefore, the lens device 2 of the second embodiment is capable of good optical performance.

Figure 5:
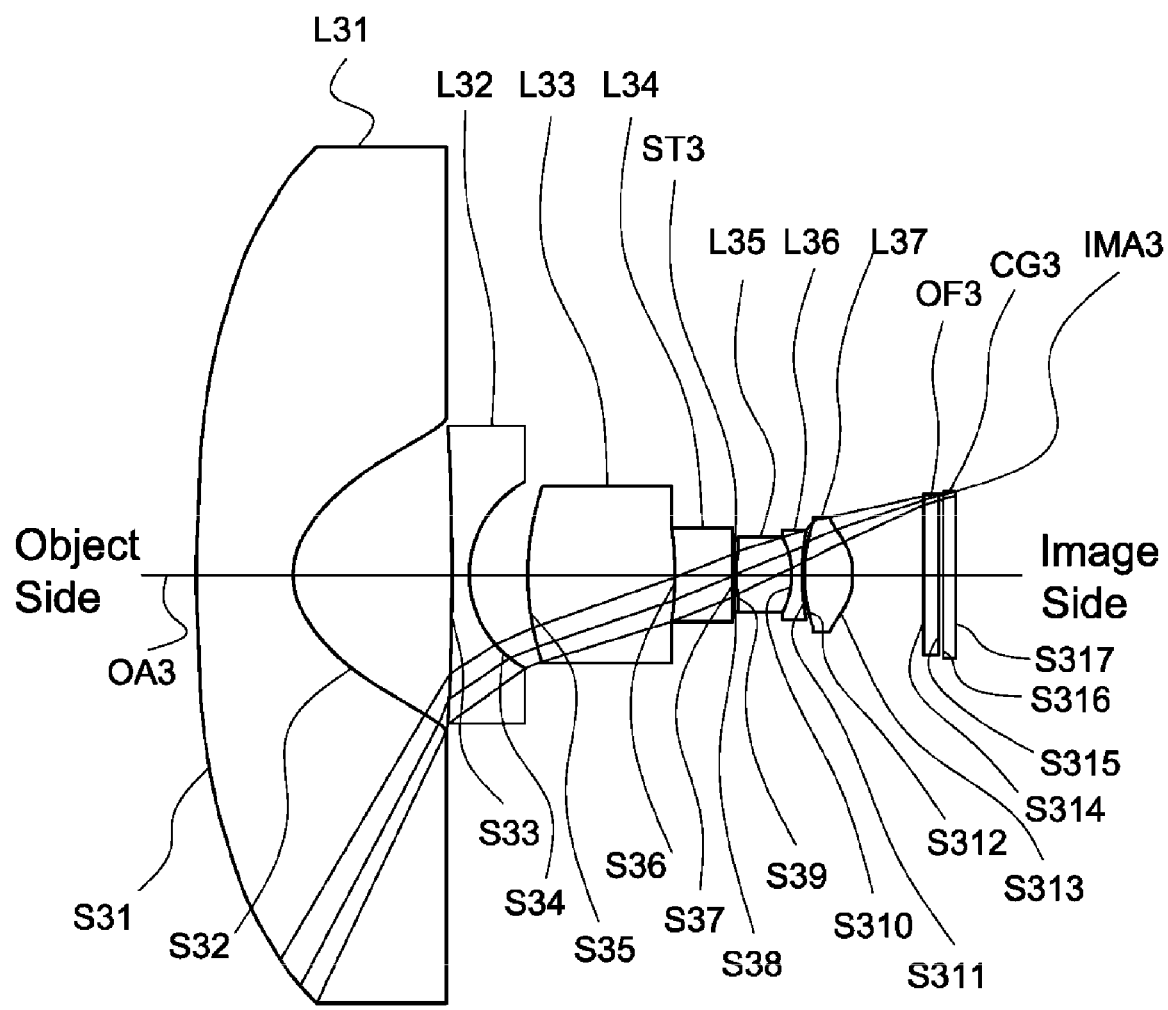
FIG. 5 is a lens layout and optical path diagram of a lens device in accordance with a third embodiment of the invention.

Referring to FIG. 5, FIG. 5 is a lens layout and optical path diagram of a lens device in accordance with a third embodiment of the invention. The lens device 3 consists essentially of a first lens L31, a second lens L32, a third lens L33, a fourth lens L34, a stop ST3, a fifth lens L35, a sixth lens L36, a seventh lens L37, an optical filter OF3, and a cover glass CG3, all of which are arranged in order from an object side to an image side along an optical axis OA3. In operation, an image of light rays from the object side is formed at an image plane IMA3.

The surface profile and sign of the refractive power of the first lens L31, the second lens L32, the third lens L33, the seventh lens L37, the optical filter OF3, and the cover glass CG3 approximate to the first lens L11, the second lens L12, the third lens L13, the seventh lens L17, the optical filter OF1, and the cover glass CG1 of the lens device 1 of the first embodiment and the material of the first lens L31 to the sixth lens L36 are similar to the first lens L11 to the sixth lens L16 of the lens device 1 of the first embodiment respectively, so that both of which are not described here again.

The fourth lens L34 is, for example, a biconcave lens and has, for example, a negative refractive power; the fifth lens L35 is, for example, a biconvex lens and has, for example, a positive refractive power; The sixth lens L36 is, for example, a biconcave lens and has, for example, a negative refractive power; and the seventh lens L37 is made of, for example, a glass material.

With the above design of the lenses and stop ST3 and at least any one of the conditions (1)-(3) satisfied, the lens device 3 can have an effective increased field of view, an effective decreased distortion, an effective increased resolution, an effective resisted environmental temperature change, and is capable of an effective corrected aberration.

Table 7 shows the optical specification of the lens device 3 in FIG. 5.

TABLE 7

Effective Focal Length = 0.972 mm F-number = 2.6
Total Lens Length = 28.338 mm Field of View = 149.1 Degrees

| Surface Number | Radius of Curvature (mm) | Thickness (mm) | Nd | Vd | Remark |
|---|---|---|---|---|---|
| S31 | 85.703 | 3.40 | 1.532 | 55.839 | The First Lens L31 |
| S32 | 2.845 | 5.99 | | | |
| S33 | −104.011 | 0.65 | 1.595 | 67.736 | The Second Lens L32 |
| S34 | 3.976 | 2.92 | | | |
| S35 | 9.583 | 5.60 | 1.846 | 23.780 | The Third Lens L33 |
| S36 | −9.499 | 1.47 | 1.595 | 67.736 | The Fourth Lens L34 |
| S37 | 23.495 | 0.06 | | | |
| S38 | ∞ | 0.09 | | | Stop ST3 |
| S39 | 4.308 | 2.02 | 1.595 | 67.736 | The Fifth Lens L35 |
| S310 | −2.899 | 0.40 | 1.846 | 23.780 | The Sixth Lens L36 |
| S311 | 9.993 | 0.05 | | | |
| S312 | 4.799 | 1.89 | 1.595 | 67.736 | The Seventh Lens L37 |
| S313 | −2.137 | 2.60 | | | |
| S314 | ∞ | 0.55 | 1.517 | 61.167 | Optical Filter OF3 |
| S315 | ∞ | 0.20 | | | |
| S316 | ∞ | 0.45 | 1.517 | 61.167 | Cover Glass CG3 |
| S317 | ∞ | 0.00 | | | |

In the third embodiment, the conic constant k and the aspheric coefficients A, B, C, D, E, F, G of each surface are shown in Table 8.

TABLE 8

| Surface Number | k | A<br>E | B<br>F | C<br>G | D |
|---|---|---|---|---|---|
| S31 | −3.73E+03 | 1.94E−04<br>3.66E−13 | −2.15E−06<br>−7.38E−16 | 1.86E−08<br>6.63E−19 | −1.04E−10 |
| S32 | −8.14E−01 | −1.80E−03<br>3.31E−10 | 4.97E−05<br>2.40E−11 | −1.80E−06<br>−8.51E−13 | −4.58E−09 |
| S312 | −2.95E+01 | 1.48E−02<br>−4.37E−04 | −7.90E−03<br>1.02E−04 | 2.12E−03<br>−8.59E−06 | 5.24E−04 |
| S313 | −3.89E+00 | −3.19E−02<br>−6.04E−07 | 6.72E−03<br>1.83E−05 | −4.76E−04<br>−2.19E−06 | −1.36E−04 |

Table 9 shows the parameters and condition values for conditions (1)-(3) in accordance with the third embodiment of the invention. It can be seen from Table 9 that the lens device 3 of the third embodiment satisfies the conditions (1)-(3).

Figure 6A:
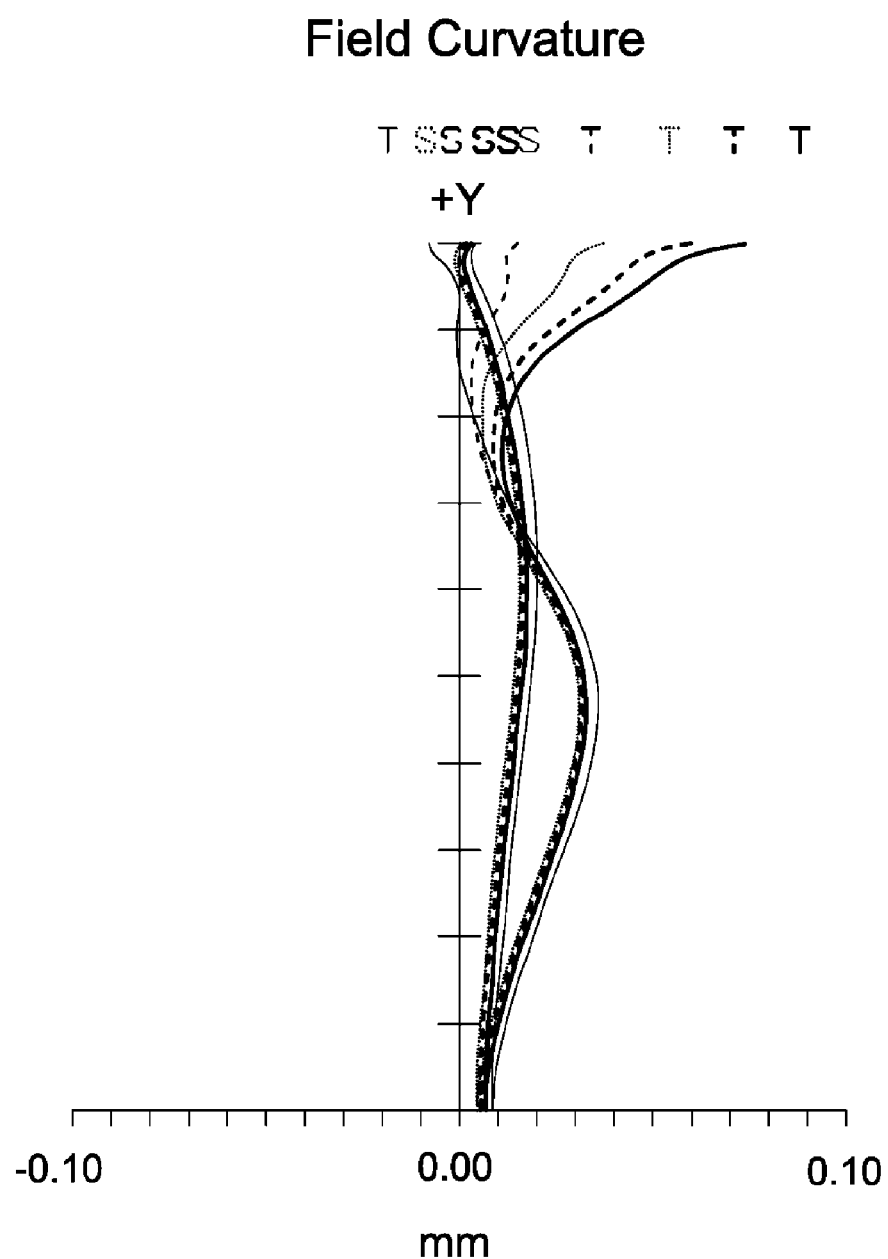
FIG. 6A depicts a field curvature diagram of the lens device in accordance with the third embodiment of the invention.
Figure 6B:
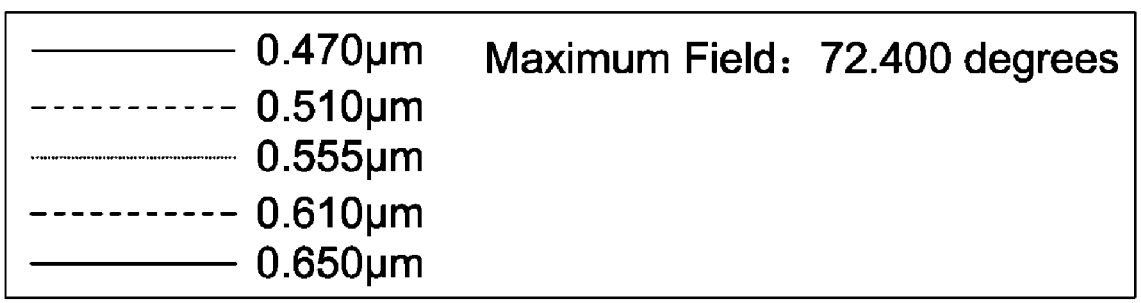
FIG. 6B is a distortion diagram of the lens device in accordance with the third embodiment of the invention.
Figure 6B:
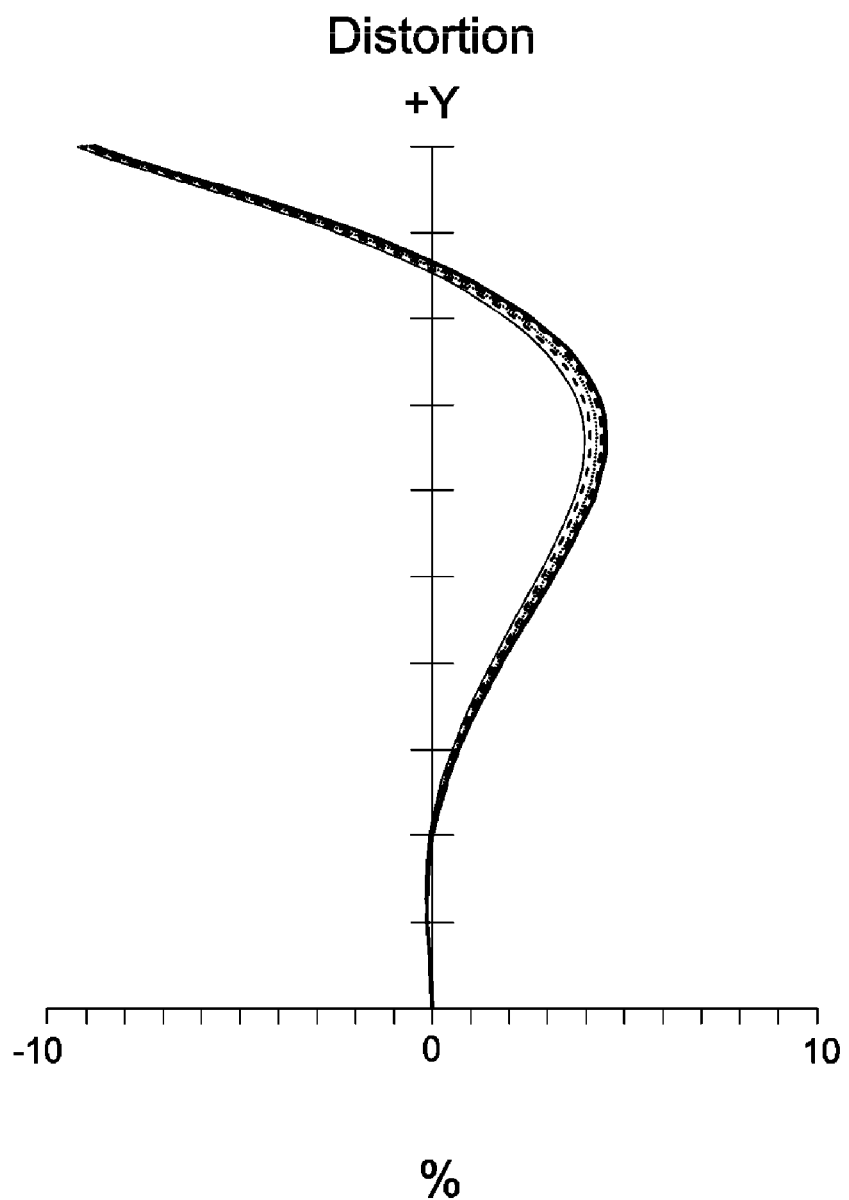
Figure 6C:
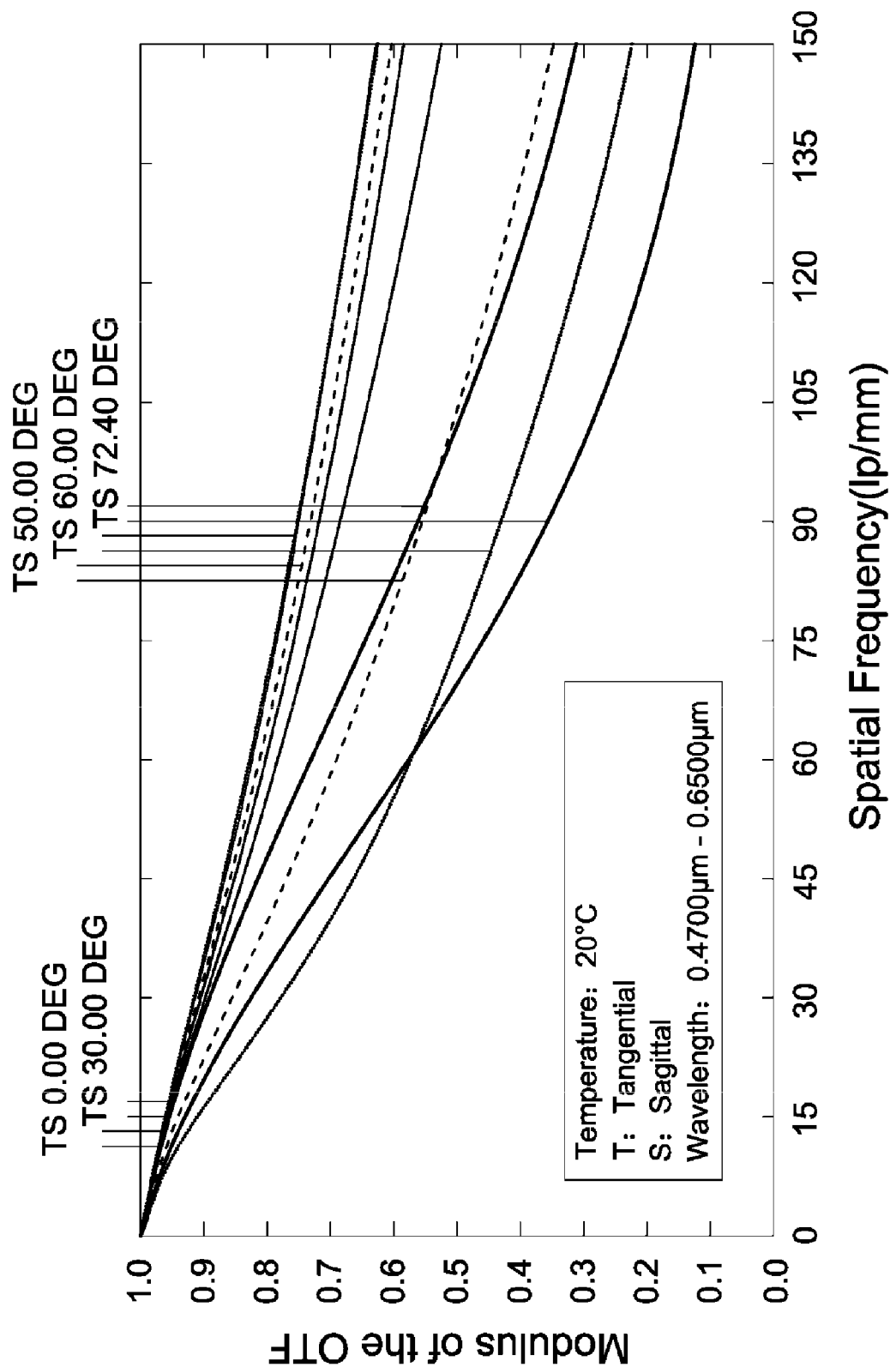
FIG. 6C is a modulation transfer function diagram as temperature is equal to 20° C. for the lens device in accordance with the third embodiment of the invention.
Figure 6D:
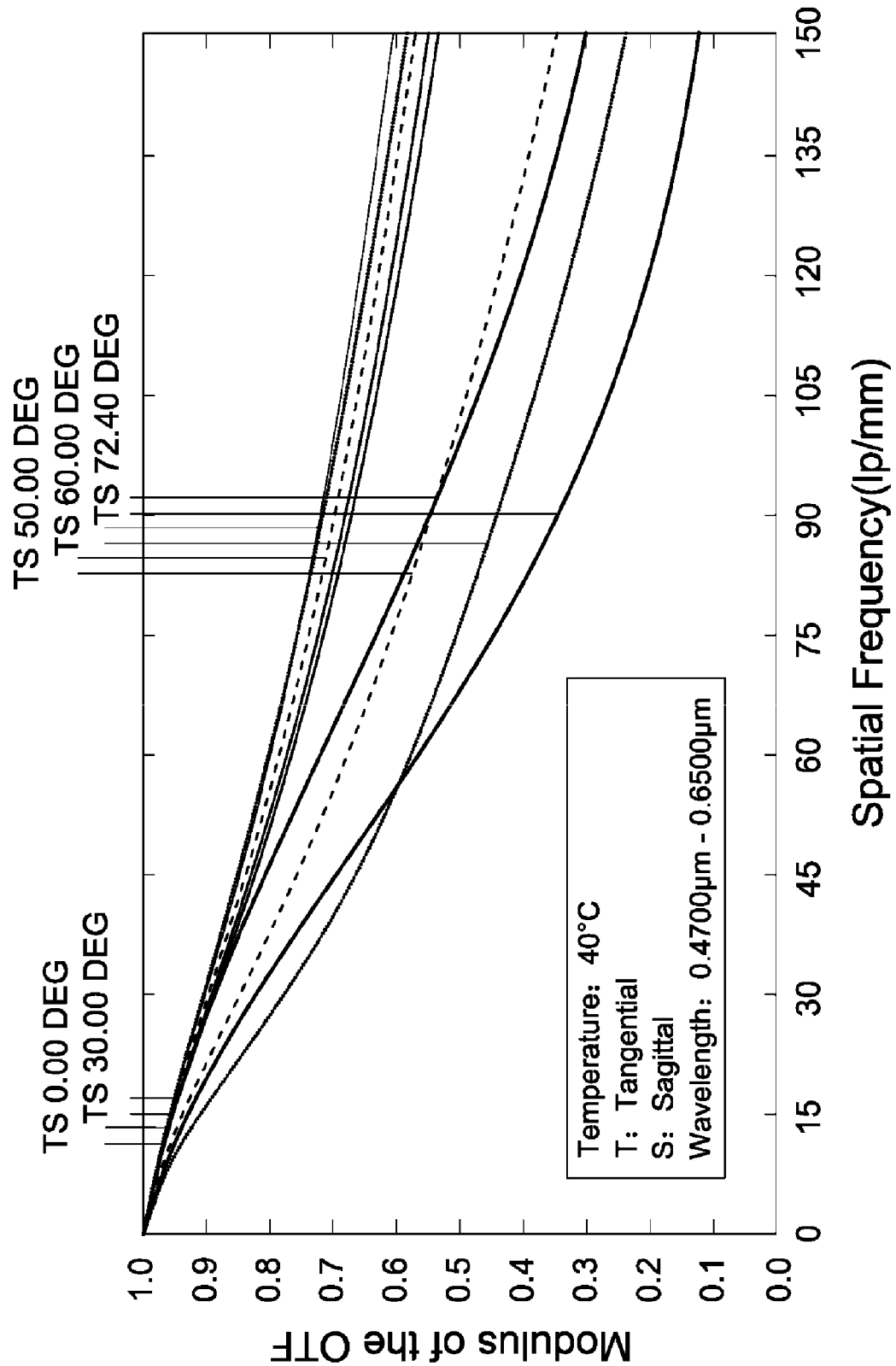
FIG. 6D is a modulation transfer function diagram as temperature is equal to 40° C. for the lens device in accordance with the third embodiment of the invention.
Figure 6E:
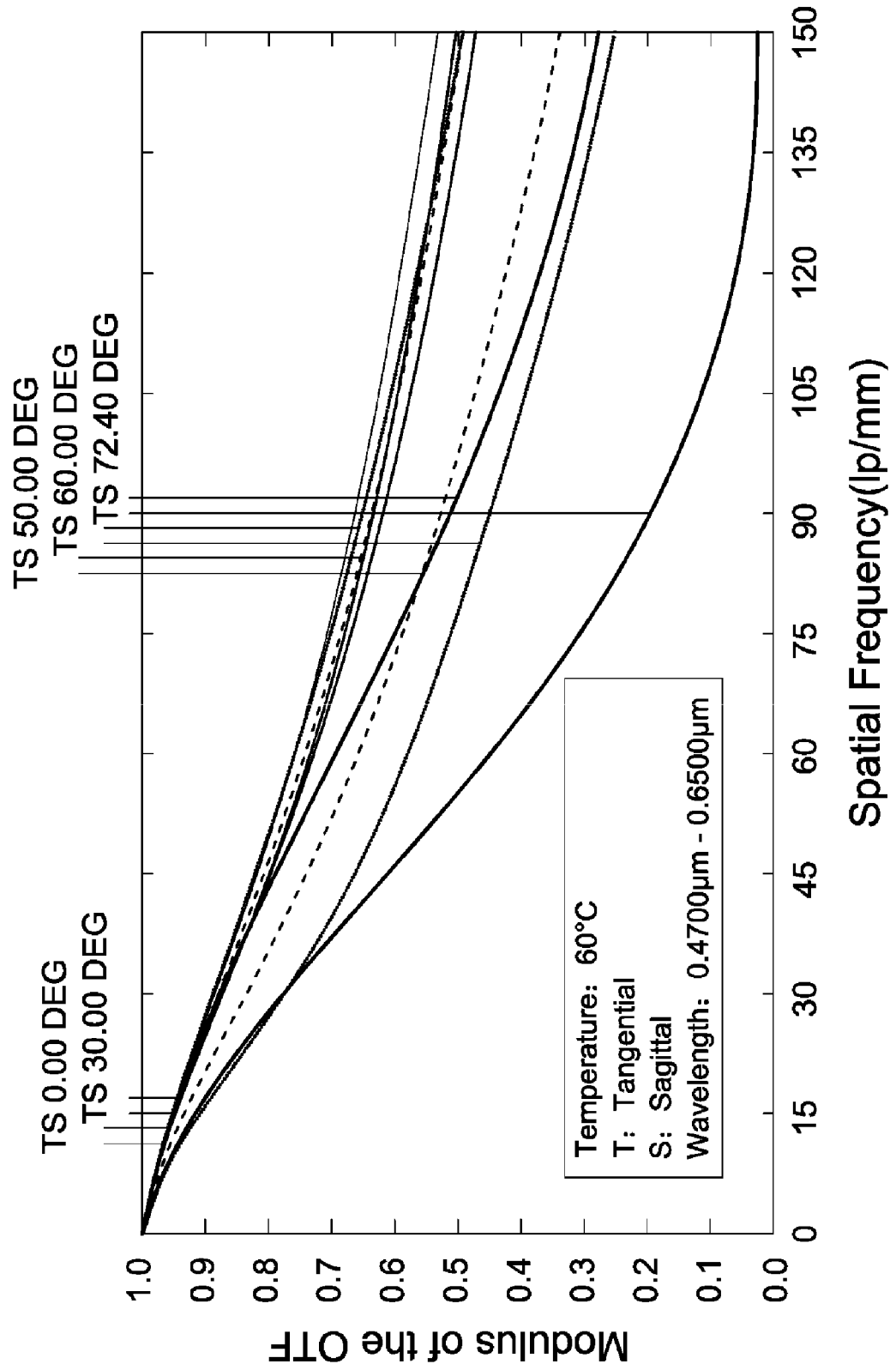
FIG. 6E is a modulation transfer function diagram as temperature is equal to 60° C. for the lens device in accordance with the third embodiment of the invention.
Figure 6F:
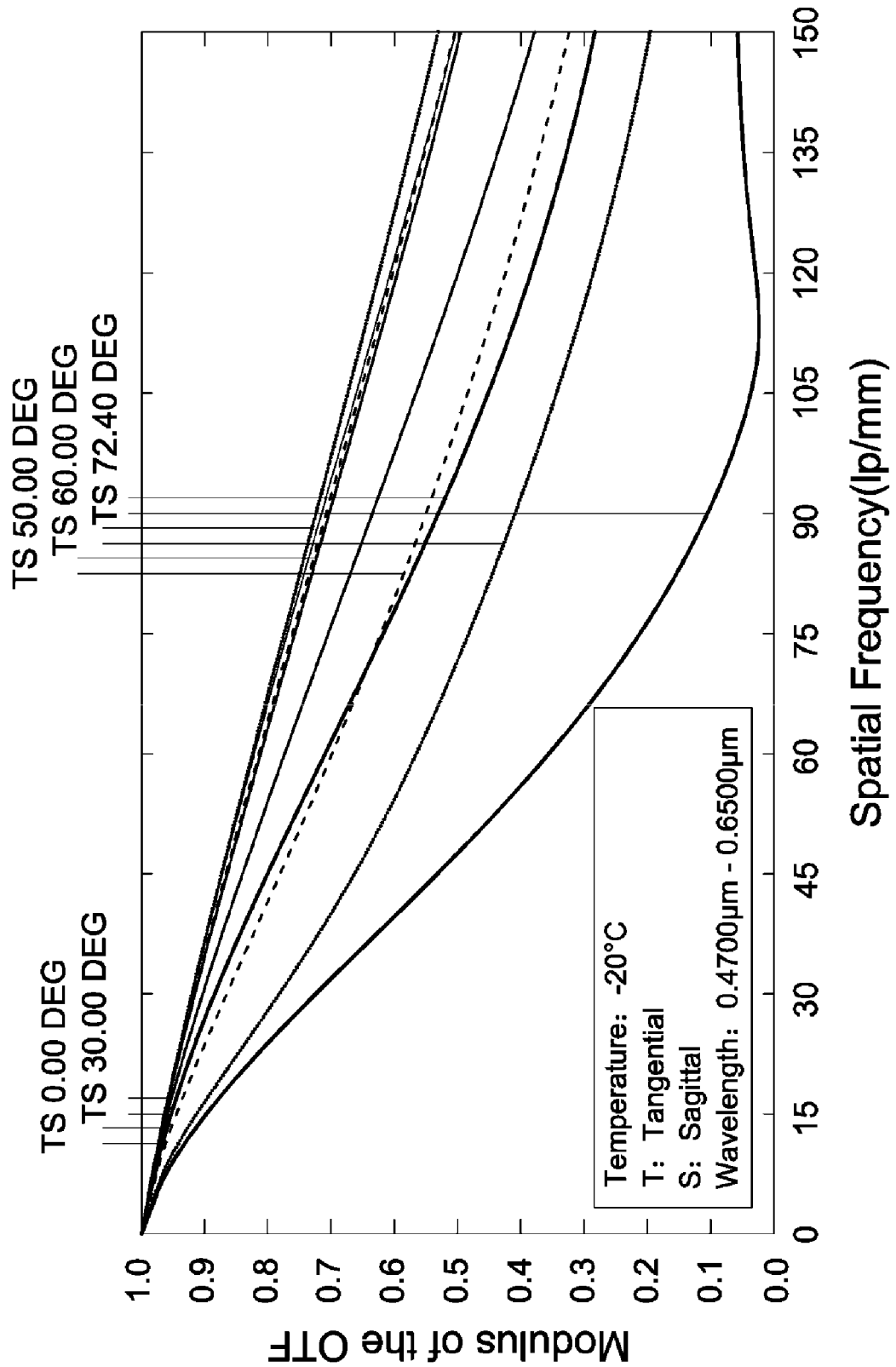
FIG. 6F is a modulation transfer function diagram as temperature is equal to −20° C. for the lens device in accordance with the third embodiment of the invention.

By the above arrangements of the lenses and stop ST3, the lens device 3 of the third embodiment can meet the requirements of optical performance as seen in FIGS. 6A-6F, wherein FIG. 6A shows a field curvature diagram of the lens device 3 in accordance with the third embodiment of the invention, FIG. 6B shows a distortion diagram of the lens device 3 in accordance with the third embodiment of the invention, FIG. 6C shows a modulation transfer function diagram as temperature is equal to 20° C. for the lens device 3 in accordance with the third embodiment of the invention, FIG. 6D shows a modulation transfer function diagram as temperature is equal to 40° C. for the lens device 3 in accordance with the third embodiment of the invention, FIG. 6E shows a modulation transfer function diagram as temperature is equal to 60° C. for the lens device 3 in accordance with the third embodiment of the invention, and FIG. 6F shows a modulation transfer function diagram as temperature is equal to −20° C. for the lens device 3 in accordance with the third embodiment of the invention.

It can be seen from FIG. 6A that the field curvature of tangential direction and sagittal direction in the lens device 3 of the third embodiment ranges from −0.01 mm to 0.08 mm.

It can be seen from FIG. 6B that the distortion in the lens device 3 of the third embodiment ranges from −10% to 5%.

It can be seen from FIGS. 6C-6F that the modulation transfer function of tangential direction and sagittal direction in the lens device 3 of the third embodiment ranges from 0.12 to 1.0, 0.12 to 1.0, 0.02 to 1.0, and 0.01 to 1.0 as temperature is equal to 20° C., 40° C., 60° C., and −20° C. respectively.

It is obvious that the field curvature and the distortion of the lens device 3 of the third embodiment can be corrected effectively, and the resolution of the lens device 3 of the third embodiment can meet the requirement. Therefore, the lens device 3 of the third embodiment is capable of good optical performance.

Figure 7:
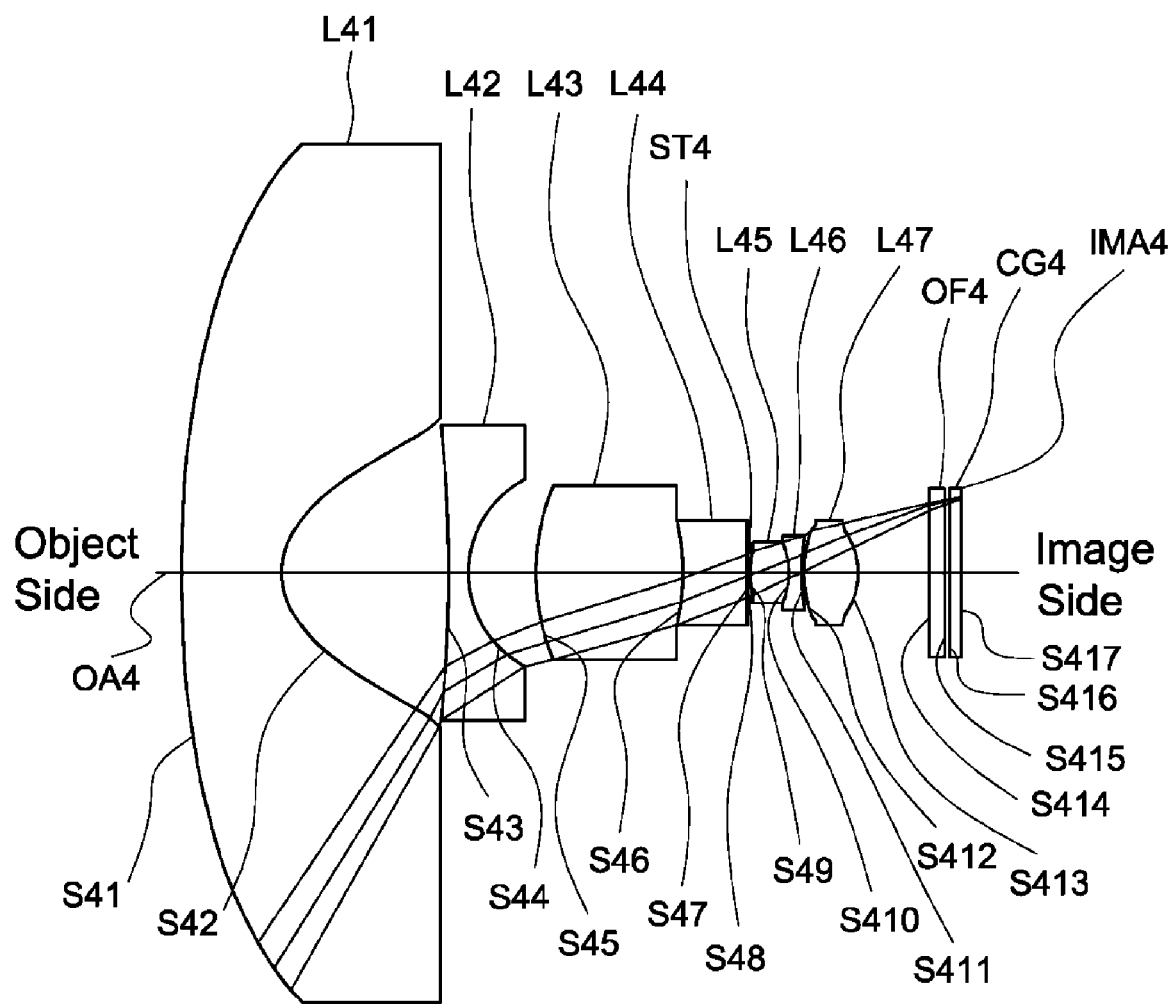
FIG. 7 is a lens layout and optical path diagram of a lens device in accordance with a fourth embodiment of the invention.

Referring to FIG. 7, FIG. 7 is a lens layout and optical path diagram of a lens device in accordance with a fourth embodiment of the invention. The lens device 4 consists essentially of a first lens L41, a second lens L42, a third lens L43, a fourth lens L44, a stop ST4, a fifth lens L45, a sixth

TABLE 9

| $f_1$ | −5.823 mm | $f_2$ | −6.387 mm | $f_3$ | 6.425 mm |
|---|---|---|---|---|---|
| $f_4$ | −11.12 mm | $f_5$ | 3.235 mm | $f_6$ | −2.579 mm |
| $f_7$ | 3.135 mm | $CTE_1$ | 59 × 10⁻⁶/° C. | $CTE_2$ | 11.7 × 10⁻⁶/° C. |
| $CTE_5$ | 8.67 × 10⁻⁶/° C. | $CTE_4$ | 11.7 × 10⁻⁶/° C. | $CTE_5$ | 11.7 × 10⁻⁶/° C. |
| $CTE_6$ | 8.67 × 10⁻⁶/° C. | $CTE_7$ | 6 × 10⁻⁶/° C. | $f_1 + f_2$ | −12.21 mm |
| $CTE_1 + CTE_2$ | 70.7 × 10⁻⁶/° C. | $Vd_1 + Vd_2$ | 123.575 | | | lens L46, a seventh lens L47, an optical filter OF4, and a cover glass CG4, all of which are arranged in order from an object side to an image side along an optical axis OA4. In operation, an image of light rays from the object side is formed at an image plane IMA4.

The surface profile and sign of the refractive power of the first lens L41, the second lens L42, the third lens L43, the seventh lens L47, the optical filter OF4, and the cover glass CG4 approximate to the first lens L11, the second lens L12, the third lens L13, the seventh lens L17, the optical filter OF1, and the cover glass CG1 of the lens device 1 of the first embodiment and the material of the first lens L41 to the sixth lens L46 are similar to the first lens L11 to the sixth lens L16 of the lens device 1 of the first embodiment respectively, so that both of which are not described here again.

The fourth lens L44 is, for example, a biconcave lens and has, for example, a negative refractive power; the fifth lens L45 is, for example, a biconvex lens and has, for example, a positive refractive power; The sixth lens L46 is, for example, a biconcave lens and has, for example, a negative refractive power; and the seventh lens L47 is made of, for example, a plastic material.

With the above design of the lenses and stop ST4 and at least any one of the conditions (1)-(3) satisfied, the lens device 4 can have an effective increased field of view, an effective decreased distortion, an effective increased resolution, an effective resisted environmental temperature change, and is capable of an effective corrected aberration.

Table 10 shows the optical specification of the lens device 4 in FIG. 7.

TABLE 10

Effective Focal Length = 0.976 mm F-number = 2.6
Total Lens Length = 29.222 mm Field of View = 151.1 Degrees

| Surface Number | Radius of Curvature (mm) | Thickness (mm) | Nd | Vd | Remark |
|---|---|---|---|---|---|
| S41 | 41.688 | 3.74 | 1.532 | 55.839 | The First Lens L41 |
| S42 | 2.623 | 6.26 | | | |
| S43 | −55.543 | 0.75 | 1.595 | 67.736 | The Second Lens L42 |
| S44 | 3.997 | 2.53 | | | |
| S45 | 8.991 | 5.50 | 1.846 | 23.780 | The Third Lens L43 |
| S46 | −8.991 | 2.40 | 1.595 | 67.736 | The Fourth Lens L44 |
| S47 | 16.140 | 0.19 | | | |
| S48 | ∞ | −0.08 | | | Stop ST4 |
| S49 | 3.721 | 1.47 | 1.595 | 67.736 | The Fifth Lens L45 |
| S410 | −3.063 | 0.49 | 1.846 | 23.780 | The Sixth Lens L46 |
| S411 | 7.566 | 0.05 | | | |
| S412 | 3.928 | 2.05 | 1.535 | 56.115 | The Seventh Lens L47 |
| S413 | −2.399 | 2.67 | | | |
| S414 | ∞ | 0.55 | 1.517 | 61.167 | Optical Filter OF4 |
| S415 | ∞ | 0.20 | | | |
| S416 | ∞ | 0.45 | 1.517 | 61.167 | Cover Glass CG4 |
| S417 | ∞ | 0.00 | | | |

In the fourth embodiment, the conic constant k and the aspheric coefficients A, B, C, D, E, F, G of each surface are shown in Table 11.

TABLE 11

| Surface Number | k | A E | B F | C G | D |
|---|---|---|---|---|---|
| S41 | −2.68E+02 | 1.79E−04 3.68E−13 | −2.12E−06 −7.31E−16 | 1.86E−08 6.30E−19 | −1.05E−10 |
| S42 | −8.22E−01 | −1.50E−03 7.87E−11 | 3.44E−05 1.08E−11 | −1.69E−06 −7.55E−13 | −8.35E−09 |
| S412 | −2.67E+01 | 2.94E−02 −8.33E−04 | −1.33E−02 2.74E−04 | 4.96E−03 −2.94E−05 | 2.19E−04 |
| S413 | −3.43E+00 | −1.68E−02 7.55E−05 | 2.56E−03 −2.14E−05 | 7.27E−04 3.54E−06 | −2.12E−04 |

Table 12 shows the parameters and condition values for conditions (1)-(3) in accordance with the fourth embodiment of the invention. It can be seen from Table 12 that the lens device 4 of the fourth embodiment satisfies the conditions (1)-(3).

TABLE 12

| | | | | | |
|---|---|---|---|---|---|
| $f_1$ | −5.415 mm | $f_2$ | −6.203 mm | $f_3$ | 6.096 mm |
| $f_4$ | −9.319 mm | $f_5$ | 3.056 mm | $f_6$ | −2.486 mm |
| $f_7$ | 3.119 mm | $CTE_1$ | 59 × 10$^{-6}$/° C. | $CTE_2$ | 11.7 × 10$^{-6}$/° C. |
| $CTE_3$ | 8.67 × 10$^{-6}$/° C. | $CTE_4$ | 11.7 × 10$^{-6}$/° C. | $CTE_5$ | 11.7 × 10$^{-6}$/° C. |
| $CTE_6$ | 8.67 × 10$^{-6}$/° C. | $CTE_7$ | 61 × 10$^{-6}$/° C. | $f_1 + f_2$ | −11.618 mm |
| $CTE_1 + CTE_2$ | 70.7 × 10$^{-6}$/° C. | $Vd_1 + Vd_2$ | 123.575 | | |

Figure 8A:
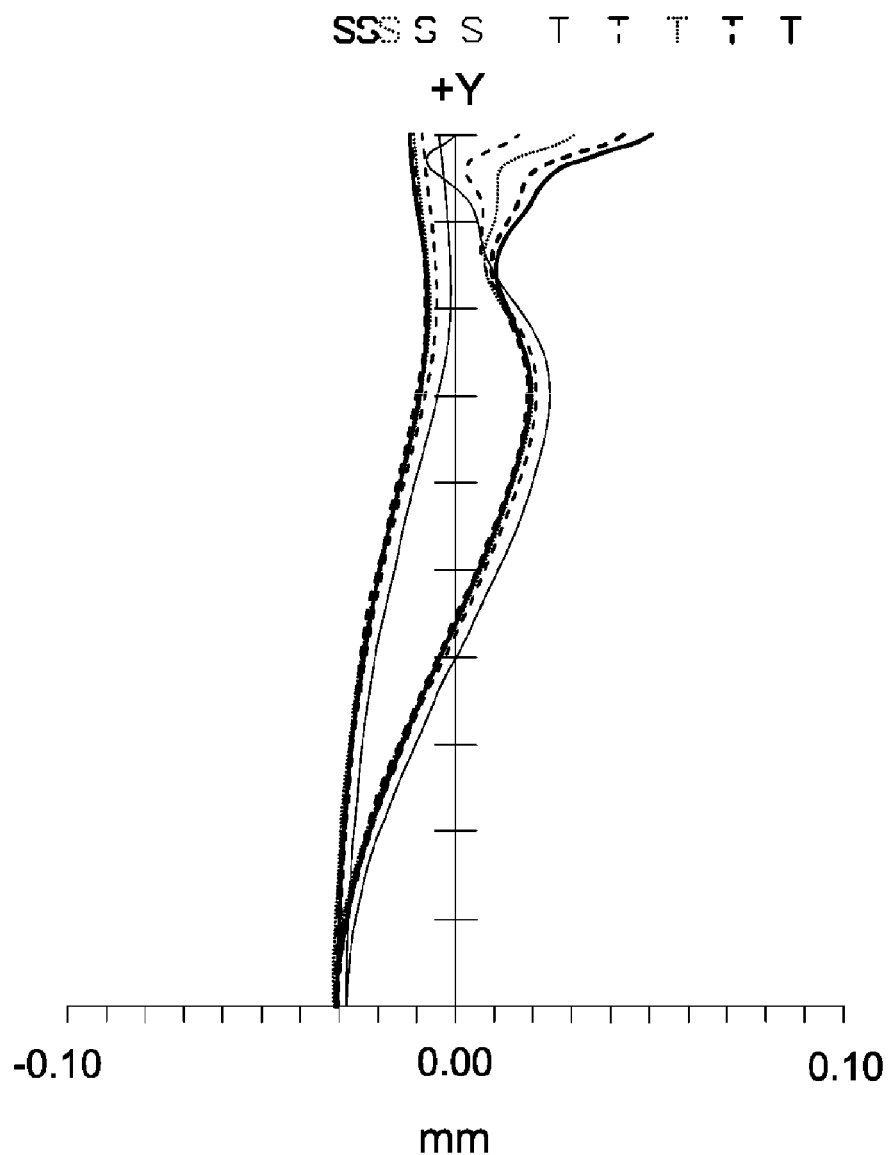
FIG. 8A depicts a field curvature diagram of the lens device in accordance with the fourth embodiment of the invention.
Figure 8B:
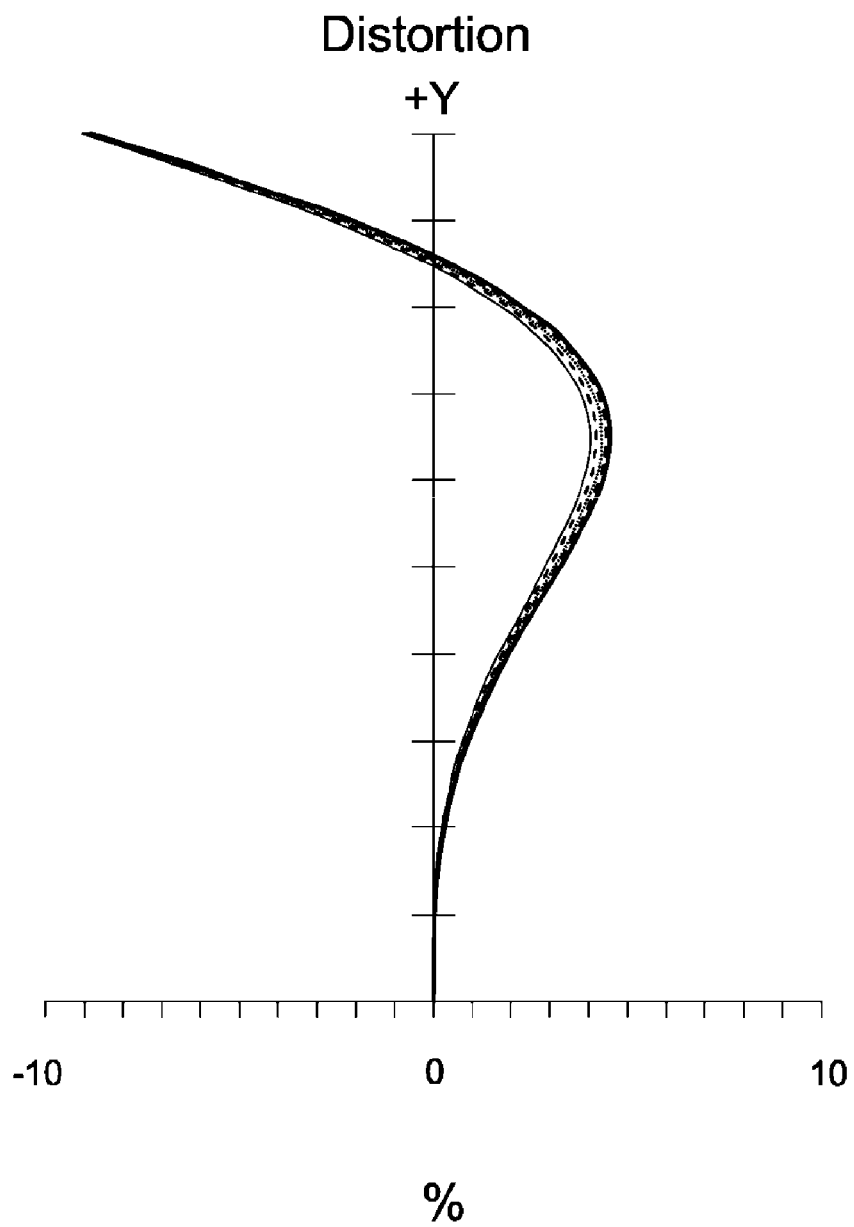
FIG. 8B is a distortion diagram of the lens device in accordance with the fourth embodiment of the invention.
Figure 8C:
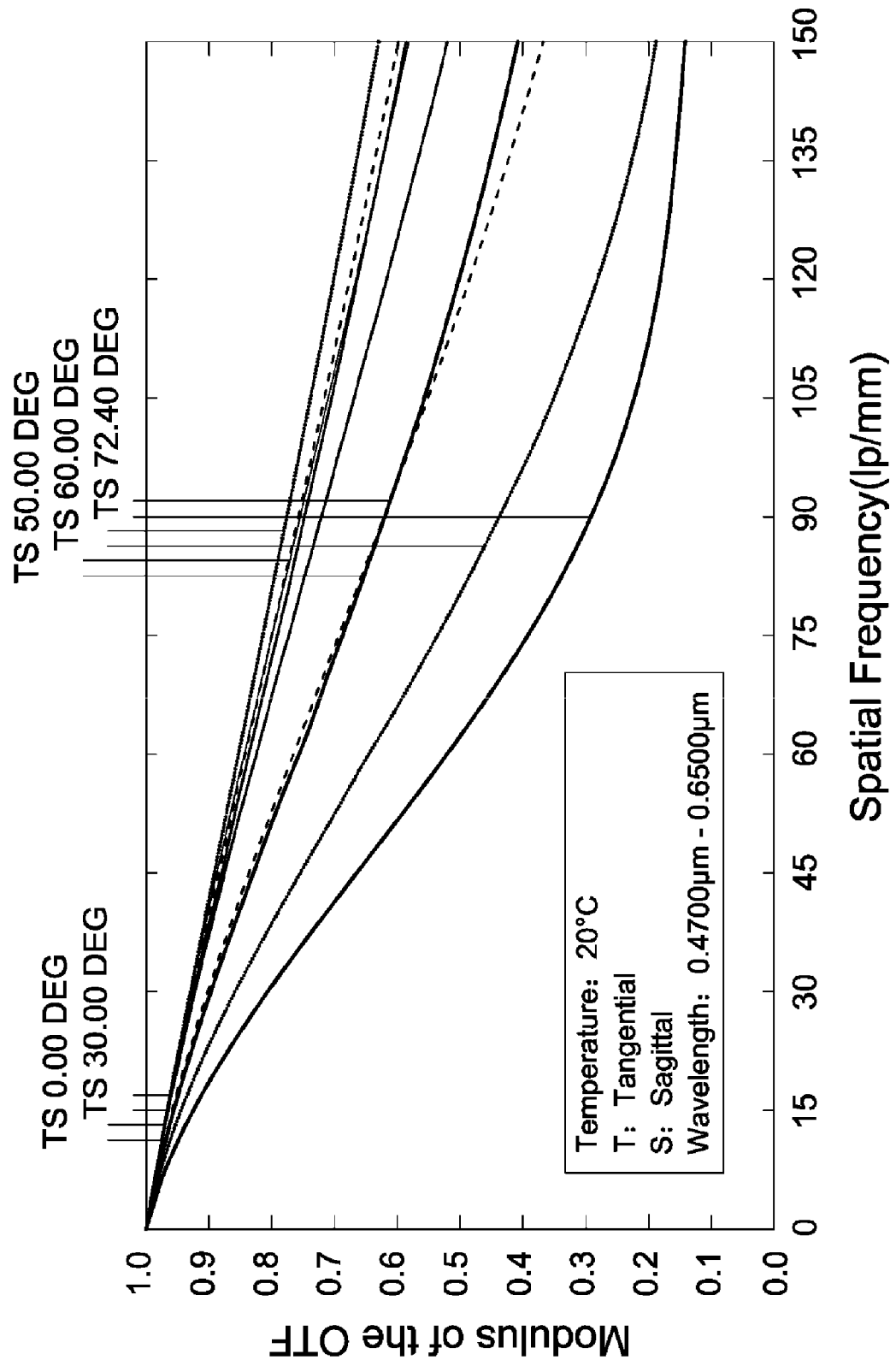
FIG. 8C is a modulation transfer function diagram as temperature is equal to 20° C. for the lens device in accordance with the fourth embodiment of the invention.
Figure 8D:
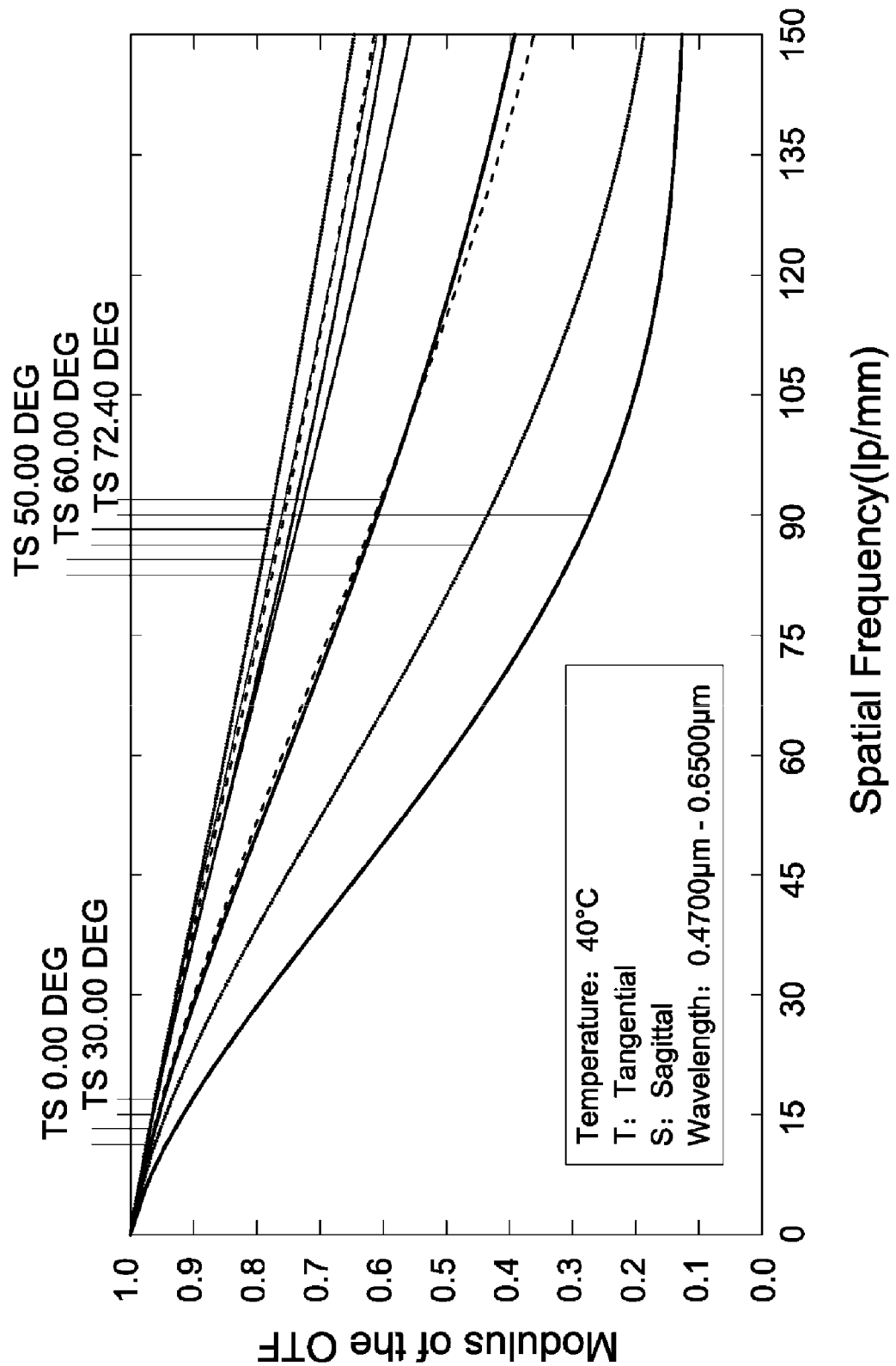
FIG. 8D is a modulation transfer function diagram as temperature is equal to 40° C. for the lens device in accordance with the fourth embodiment of the invention.
Figure 8E:
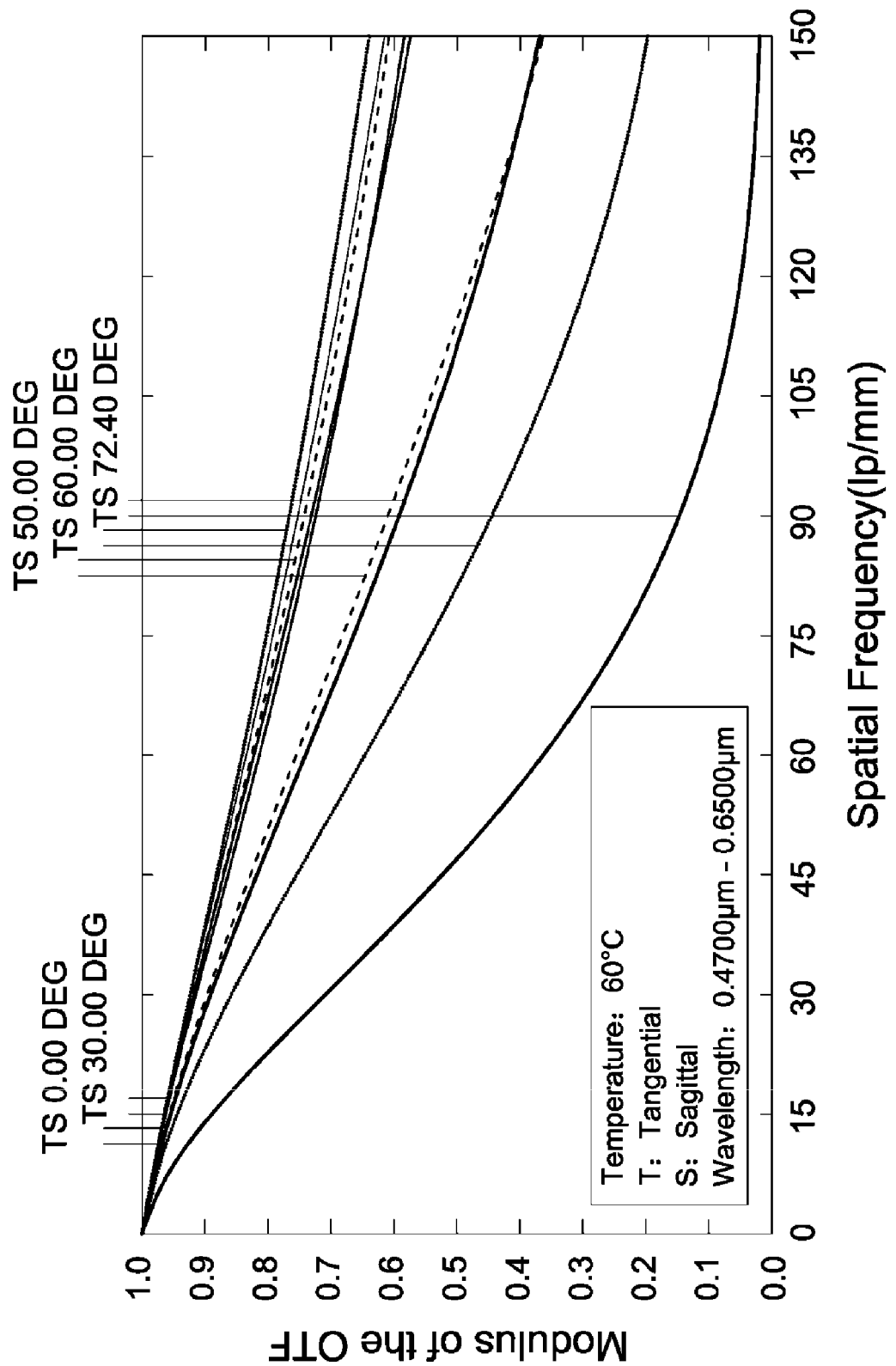
FIG. 8E is a modulation transfer function diagram as temperature is equal to 60° C. for the lens device in accordance with the fourth embodiment of the invention.
Figure 8F:
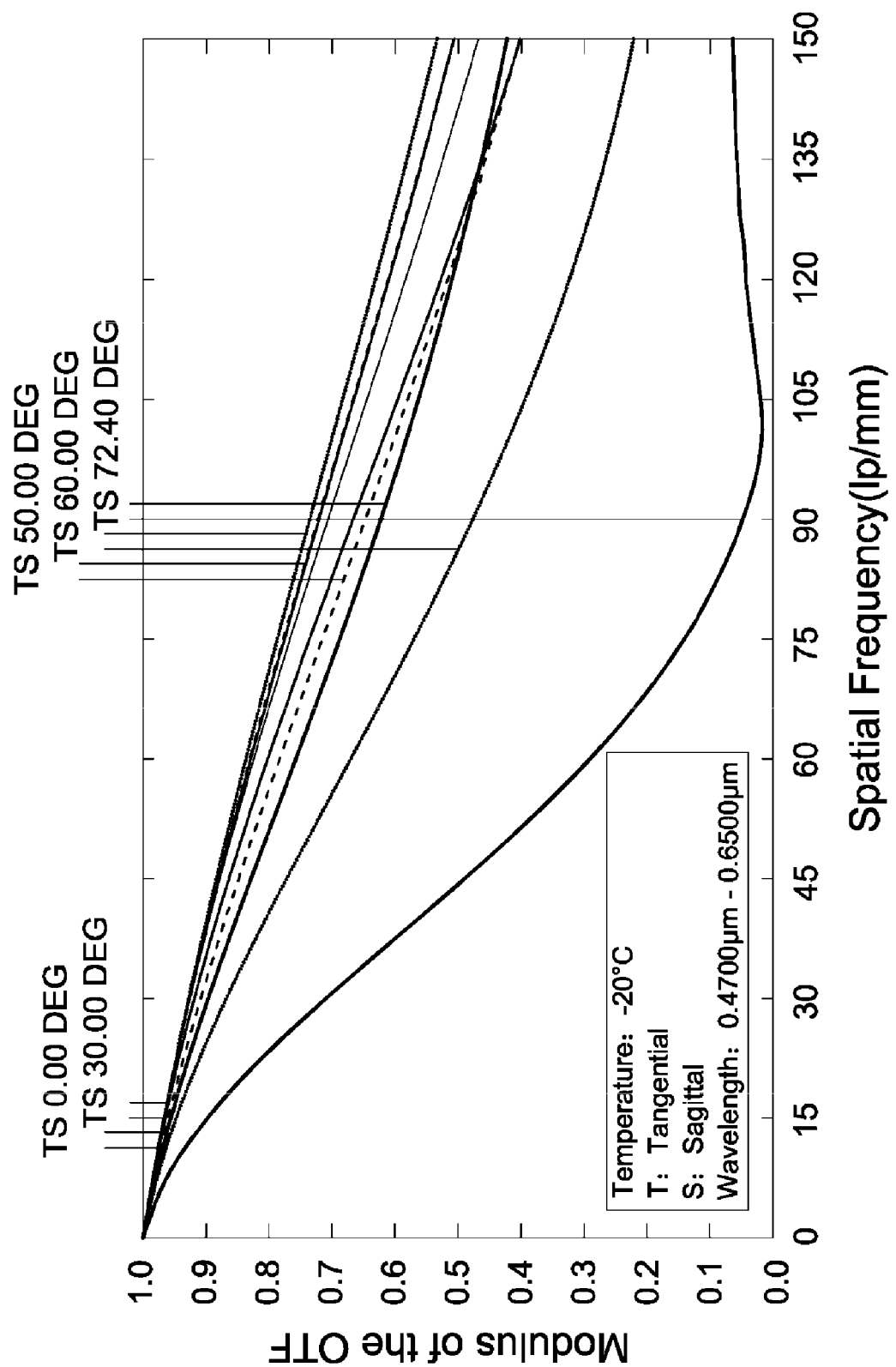
FIG. 8F is a modulation transfer function diagram as temperature is equal to −20° C. for the lens device in accordance with the fourth embodiment of the invention.

By the above arrangements of the lenses and stop ST4, the lens device 4 of the fourth embodiment can meet the requirements of optical performance as seen in FIGS. 8A-8F, wherein FIG. 8A shows a field curvature diagram of the lens device 4 in accordance with the fourth embodiment of the invention, FIG. 8B shows a distortion diagram of the lens device 4 in accordance with the fourth embodiment of the invention, FIG. 8C shows a modulation transfer function diagram as temperature is equal to 20° C. for the lens device 4 in accordance with the fourth embodiment of the invention, FIG. 8D shows a modulation transfer function diagram as temperature is equal to 40° C. for the lens device 4 in accordance with the fourth embodiment of the invention, FIG. 8E shows a modulation transfer function diagram as temperature is equal to 60° C. for the lens device 4 in accordance with the fourth embodiment of the invention, and FIG. 8F shows a modulation transfer function diagram as temperature is equal to −20° C. for the lens device 4 in accordance with the fourth embodiment of the invention.

It can be seen from FIG. 8A that the field curvature of tangential direction and sagittal direction in the lens device 4 of the fourth embodiment ranges from −0.035 mm to 0.05 mm.

It can be seen from FIG. 8B that the distortion in the lens device 4 of the fourth embodiment ranges from −10% to 5%.

It can be seen from FIGS. 8C-8F that the modulation transfer function of tangential direction and sagittal direction in the lens device 4 of the fourth embodiment ranges from 0.14 to 1.0, 0.12 to 1.0, 0.01 to 1.0, and 0.01 to 1.0 as temperature is equal to 20° C., 40° C., 60° C., and −20° C. respectively.

It is obvious that the field curvature and the distortion of the lens device 4 of the fourth embodiment can be corrected effectively, and the resolution of the lens device 4 of the fourth embodiment can meet the requirement. Therefore, the lens device 4 of the fourth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens device consisting essentially of:
a first lens which is with negative refractive power and comprises a convex surface facing an object side and a concave surface facing an image side;
a second lens which is a biconcave lens with negative refractive power;
a third lens which is with positive refractive power;
a fourth lens which is with refractive power and comprises a concave surface facing the object side;
a fifth lens which is with refractive power and comprises a convex surface facing the object side;
a sixth lens which is with refractive power; and
a seventh lens which is with positive refractive power;
wherein the first lens, the second lens, the third lens, the fourth lens, the fifth lens, the sixth lens, and the seventh lens are arranged in order from the object side to the image side along an optical axis;
wherein the third lens and the fourth lens are cemented.

2. The lens device as claimed in claim 1, wherein the lens device satisfies:

$f_1+f_2<-6$ mm;

wherein $f_1$ is an effective focal length of the first lens and $f_2$ is an effective focal length of the second lens.

3. The lens device as claimed in claim 1, wherein the lens device satisfies:

$CTE_1+CTE_2>50\times10^{-6}/°$ C.;

wherein $CTE_1$ is a coefficient of thermal expansion of the first lens and $CTE_2$ is a coefficient of thermal expansion of the second lens.

4. The lens device as claimed in claim 1, wherein the lens device satisfies:

$80<Vd_1+Vd_2<140$;

wherein $Vd_1$ is an Abbe number of the first lens and $Vd_2$ is an Abbe number of the second lens.

5. The lens device as claimed in claim 1, wherein the fifth lens and the sixth lens are cemented.

6. The lens device as claimed in claim 1, further comprising a stop disposed between the fourth lens and the fifth lens.

7. The lens device as claimed in claim 5, wherein:
the fourth lens is with positive refractive power and further comprises a convex surface facing the image side;
the fifth lens is with negative refractive power and further comprises a concave surface facing the image side; and
the sixth lens is a biconvex lens with positive refractive power.

8. The lens device as claimed in claim 1, wherein the third lens is a biconvex lens.

9. The lens device as claimed in claim 8, wherein the seventh lens is a biconvex lens.

10. The lens device as claimed in claim 1, wherein the lens device satisfies:

$-16$ mm$<f_1+f_2<-6$ mm;

$50\times10^{-6}/°$ C.$<CTE_1+CTE_2<80\times10^{-6}/°$ C.;

wherein $f_1$ is an effective focal length of the first lens, $f_2$ is an effective focal length of the second lens, CTE1 is a coefficient of thermal expansion of the first lens and CTE2 is a coefficient of thermal expansion of the second lens.

11. A lens device consisting essentially of:
a first lens which is with negative refractive power and comprises a convex surface facing an object side and a concave surface facing an image side;
a second lens which is a biconcave lens with negative refractive power;
a third lens which is with positive refractive power;
a fourth lens which is with negative refractive power and comprises a concave surface facing the object side and another concave surface facing the image side;
a fifth lens which is with positive refractive power and comprises a convex surface facing the object side and another convex surface facing the image side;
a sixth lens which is a biconcave lens with negative refractive power; and
a seventh lens which is with positive refractive power;
wherein the first lens, the second lens, the third lens, the fourth lens, the fifth lens, the sixth lens, and the seventh lens are arranged in order from the object side to the image side along an optical axis.

12. The lens device as claimed in claim 11, wherein the lens device satisfies:

$f_1+f_2<-6$ mm;

wherein $f_1$ is an effective focal length of the first lens and $f_2$ is an effective focal length of the second lens.

13. The lens device as claimed in claim 11, wherein the lens device satisfies:

$CTE_1+CTE_2>50\times10^{-6}/°$ C.;

wherein $CTE_1$ is a coefficient of thermal expansion of the first lens and $CTE_2$ is a coefficient of thermal expansion of the second lens.

14. The lens device as claimed in claim 11, wherein the lens device satisfies:

$80<Vd_1+Vd_2<140$;

wherein $Vd_1$ is an Abbe number of the first lens and $Vd_2$ is an Abbe number of the second lens.

15. The lens device as claimed in claim 11, wherein the third lens and the fourth lens are cemented.

16. The lens device as claimed in claim 15, wherein the fifth lens and the sixth lens are cemented.

17. The lens device as claimed in claim 11, further comprising a stop disposed between the fourth lens and the fifth lens.

18. The lens device as claimed in claim 11, wherein the third lens is a biconvex lens.

19. The lens device as claimed in claim 18, wherein the seventh lens is a biconvex lens.

20. The lens device as claimed in claim 11, wherein the lens device satisfies:

$$-16 \text{ mm} \leq f_1 + f_2 \leq -6 \text{ mm};$$

$$50 \times 10^{-6}/°\text{C}. < CTE_1 + CTE_2 < 80 \times 10^{-6}/°\text{C}.;$$

wherein $f_1$ is an effective focal length of the first lens, $f_2$ is an effective focal length of the second lens, CTE1 is a coefficient of thermal expansion of the first lens and CTE2 is a coefficient of thermal expansion of the second lens.

\* \* \* \* \*